(12) United States Patent
Matsumura et al.

(10) Patent No.: US 12,495,423 B2
(45) Date of Patent: Dec. 9, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Shaozhen Guo, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 436 days.

(21) Appl. No.: 17/917,432

(22) PCT Filed: Apr. 10, 2020

(86) PCT No.: PCT/JP2020/016209
§ 371 (c)(1),
(2) Date: Oct. 6, 2022

(87) PCT Pub. No.: WO2021/205667
PCT Pub. Date: Oct. 14, 2021

(65) Prior Publication Data
US 2023/0189270 A1    Jun. 15, 2023

(51) Int. Cl.
*H04W 72/21* (2023.01)
*H04W 72/541* (2023.01)

(52) U.S. Cl.
CPC ......... *H04W 72/21* (2023.01); *H04W 72/541* (2023.01)

(58) Field of Classification Search
CPC .............................. H04W 72/21; H04W 72/541
USPC ........................................................ 370/329
See application file for complete search history.

(56) References Cited

U.S. PATENT DOCUMENTS

2020/0068462 A1 * 2/2020 Zetterberg ............ H04W 16/28

FOREIGN PATENT DOCUMENTS

WO    2020/003443 A1    1/2020

OTHER PUBLICATIONS

Office Action issued in Chinese Application No. 202080101738.0; Dated Mar. 28, 2024 (12 pages).
Office Action issued in Japanese Application No. 2022-514297; Dated May 14, 2024 (6 pages).
3GPP TS 38.214 V15.9.0; "3rd Generation Partnership Project; Technical Specification Group Radio Access Network; NR; Physical layer procedures for data (Release 15)"; Mar. 2020 (107 pages).
Office Action issued in Japanese Application No. 2022-514297; Dated Dec. 26, 2023 (8 pages).
Written Opinion of the International Searching Authority issued in PCT/JP2020/016209 mailed on Nov. 24, 2020 (4 pages).

(Continued)

*Primary Examiner* — Chi Tang P Cheng
(74) *Attorney, Agent, or Firm* — Osha Bergman Watanabe & Burton LLP

(57) ABSTRACT

A terminal according to one aspect of the present disclosure includes a receiving section that receives a plurality of specific configurations in relation to a channel state information (CSI) report configuration, and a control section that configures a CSI report including CSI for each group such that the CSI report includes CSI based on a first specific configuration and CSI based on a second specific configuration, the first specific configuration and the second specific configuration being out of the plurality of specific configurations. According to one aspect of the present disclosure, it is possible to preferably use a CSI report related to group-based beam reporting.

4 Claims, 19 Drawing Sheets

(56) References Cited

OTHER PUBLICATIONS

International Search Report issued in PCT/JP2020/016209 mailed on Nov. 24, 2020 (2 pages).
3GPP Ts 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
NTT Docomo, Inc.; "Discussion on multi-beam enhancement"; 3GPP TSG RAN WG1 #96bis, R1-1904967; Xi'an, China; Apr. 8-12, 2019 (26 pages).

\* cited by examiner

FIG. 1A

```
CSI-ReportConfig ::=            SEQUENCE {
    reportConfigId              CSI-ReportConfigId,
    ...
    resourcesForChannelMeasurement          CSI-ResourceConfigId,
    csi-IM-ResourcesForInterference         CSI-ResourceConfigId        OPTIONAL,   -- Need R
    nzp-CSI-RS-ResourcesForInterference     CSI-ResourceConfigId        OPTIONAL,   -- Need R
    ...
}
```

FIG. 1B

```
CSI-ResourceConfig ::=          SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList      SEQUENCE (SIZE (1..maxNrofNZP-CSI-RS-
ResourceSetsPerConfig)) OF NZP-CSI-RS-ResourceSetId OPTIONAL,
            csi-SSB-ResourceSetList         SEQUENCE (SIZE (1..maxNrofCSI-SSB-
ResourceSetsPerConfig)) OF CSI-SSB-ResourceSetId OPTIONAL
        },
        csi-IM-ResourceSetList      SEQUENCE (SIZE (1..maxNrofCSI-IM-
ResourceSetsPerConfig)) OF CSI-IM-ResourceSetId
    },
    ...
    resourceType                ENUMERATED { aperiodic, semiPersistent, periodic },
    ...
}
```

FIG. 2A

```
NZP-CSI-RS-ResourceSet ::=     SEQUENCE {
    nzp-CSI-RS-ResourceSetId       NZP-CSI-RS-ResourceSetId,
    nzp-CSI-RS-Resources           SEQUENCE (SIZE (1..maxNrofNZP-CSI-RS-ResourcesPerSet)) OF
                                       NZP-CSI-RS-ResourceId,
    ...
}

NZP-CSI-RS-Resource ::=        SEQUENCE {
    nzp-CSI-RS-ResourceId          NZP-CSI-RS-ResourceId,
    resourceMapping                CSI-RS-ResourceMapping,
    ...
    qcl-InfoPeriodicCSI-RS         TCI-StateId             OPTIONAL,    -- Cond Periodic
    ...
}
```

FIG. 2B

```
CSI-SSB-ResourceSet ::=        SEQUENCE {
    csi-SSB-ResourceSetId          CSI-SSB-ResourceSetId,
    csi-SSB-ResourceList           SEQUENCE (SIZE(1..maxNrofCSI-SSB-ResourcePerSet)) OF
                                       SSB-Index,
    ...
}

SSB-Index ::=                  INTEGER (0..63)
```

```
TCI-State ::=            SEQUENCE {
    tci-StateId              TCI-StateId,
    qcl-Type1                QCL-Info,
    qcl-Type2                QCL-Info                           OPTIONAL,    -- Need R
    ...
}

QCL-Info ::=             SEQUENCE {
    cell                     ServCellIndex                      OPTIONAL,    -- Need R
    bwp-Id                   BWP-Id                             OPTIONAL,    -- Cond CSI-RS-Indicated
    referenceSignal          CHOICE {
        csi-rs                   NZP-CSI-RS-ResourceId,
        ssb                      SSB-Index
    },
    qcl-Type                 ENUMERATED {typeA, typeB, typeC, typeD},
    ...
}
```

FIG. 3

```
CSI-ReportConfig ::=         SEQUENCE {
    reportConfigId               CSI-ReportConfigId,
    ...
    reportQuantity               CHOICE {
        none                         NULL,
        cri-RI-PMI-CQI               NULL,
        cri-RI-i1                    NULL,
        cri-RI-i1-CQI                SEQUENCE {
            pdsch-BundleSizeForCSI       ENUMERATED {n2, n4}          OPTIONAL
        },
        cri-RI-CQI                   NULL,
        cri-RSRP                     NULL,
        ssb-Index-RSRP               NULL,
        cri-RI-LI-PMI-CQI            NULL
    },
    ...
    groupBasedBeamReporting      CHOICE {
        enabled                      NULL,
        disabled                     SEQUENCE {
            nrofReportedRS               ENUMERATED {n1, n2, n3, n4}    OPTIONAL -- Need S
        }
    },
    ...
}
```

FIG. 4

| CSI report number | CSI fields |
|---|---|
| CSI report #n | CRI or SSBRI #1, if reported |
| | CRI or SSBRI #2, if reported |
| | CRI or SSBRI #3, if reported |
| | CRI or SSBRI #4, if reported |
| | RSRP #1, if reported |
| | Differential RSRP #2, if reported |
| | Differential RSRP #3, if reported |
| | Differential RSRP #4, if reported |

FIG. 5

```
CSI-ReportConfig ::=         SEQUENCE {
    reportConfigId              CSI-ReportConfigId,
    ...
    resourcesForChannelMeasurement    CSI-ResourceConfigId,
    csi-IM-ResourcesForInterference   CSI-ResourceConfigId    OPTIONAL,   -- Need R
    nzp-CSI-RS-ResourcesForInterference  CSI-ResourceConfigId OPTIONAL,   -- Need R
    ...
}
```

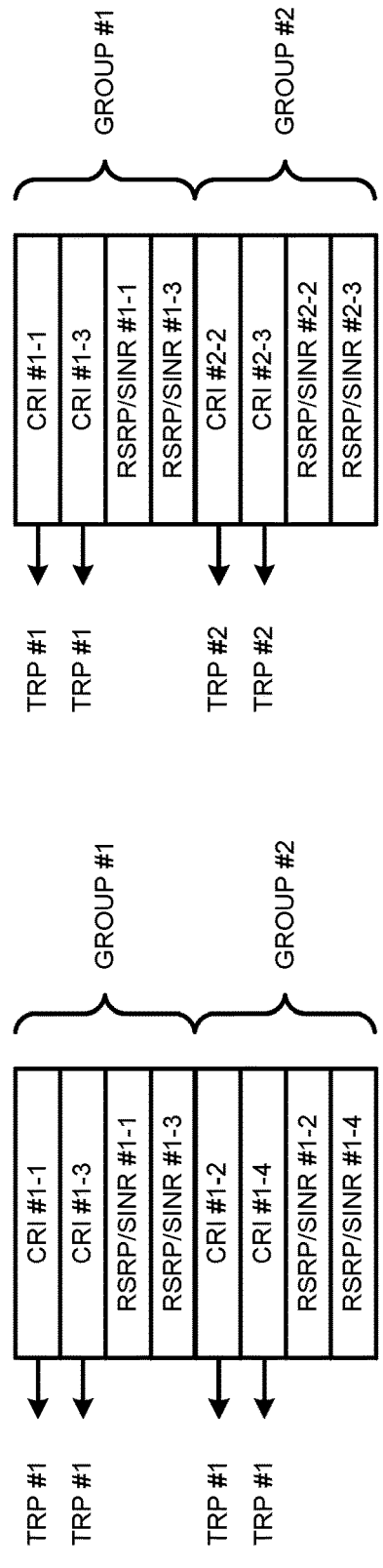

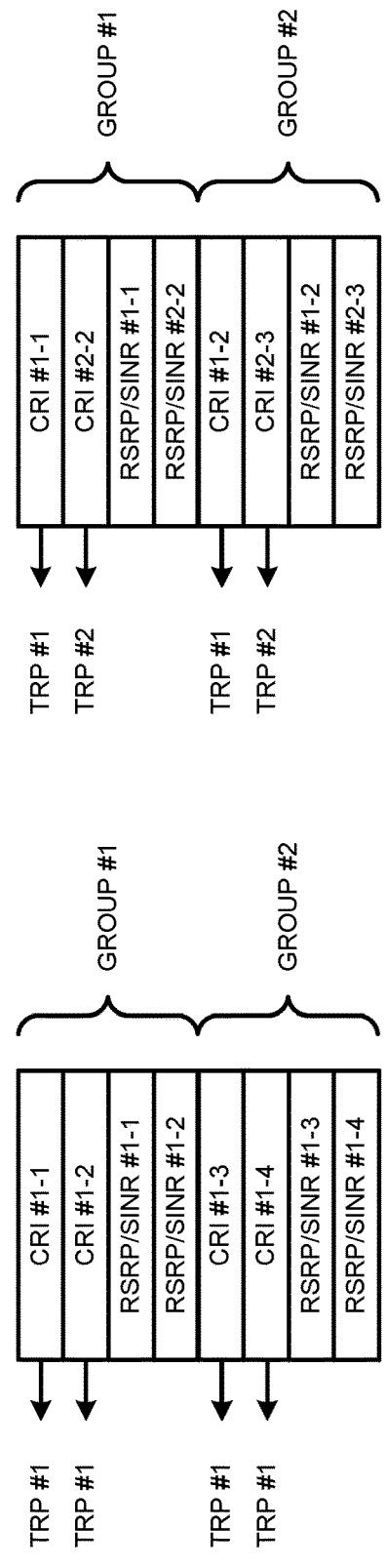

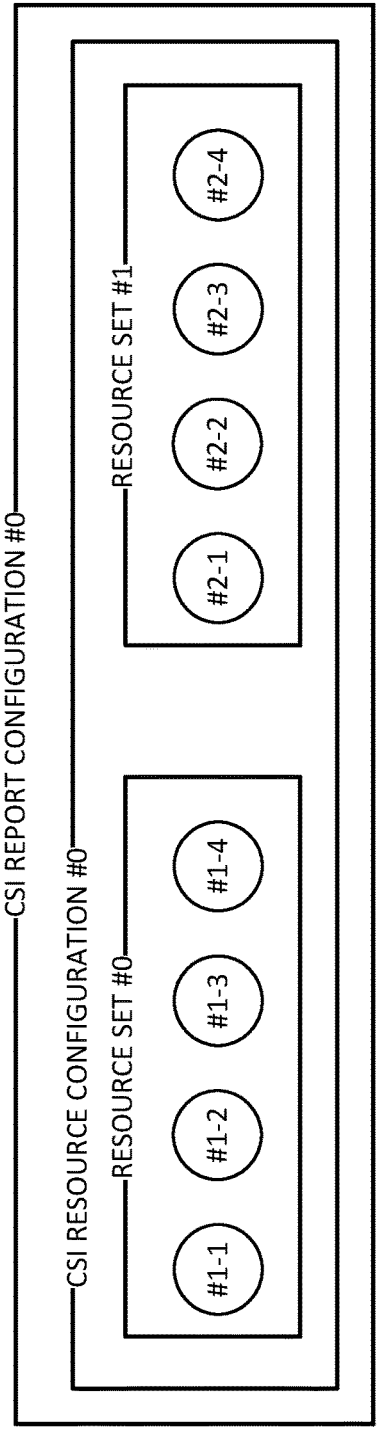

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CLTATLON LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In Rel-15 NR and Rel-16 NR, a UE for which group-based beam reporting is configured to be enabled can report only two different beam indices with respect to each report configuration. Thus, for Rel. 17, allowing the number of groups capable of being reported by the group-based beam reporting to be greater than 2 is under study.

However, a study of a method for appropriately judging which beam index the UE can simultaneously receive has not yet proceeded. Unless this is clarified, for example, a base station simultaneously transmits beams incapable or being simultaneously received by the UE, and communication throughput may be reduced.

Thus, an object of the present disclosure is to provide a terminal, a radio communication method, and a base station that can preferably use a CSI report related to group-based beam reporting.

Solution to Problem

A terminal according to one aspect of the present disclosure includes a receiving section that receives a plurality of specific configurations in relation to a channel state information (CSI) report configuration, and a control section that configures a CSI report including CSI for each group such that the CSI report includes CSI based on a first specific configuration and CSI based on a second specific configuration, the first specific configuration and the second specific configuration being out of the plurality of specific configurations.

Advantageous Effects of Invention

According to one aspect of the present disclosure, it is possible to preferably use a CSI report for an SINR related to group-based beam reporting.

BRIEF DESCRIPTION OF DRAWINGS

FIGS. 1A and 1B are diagrams to show an example of an RRC information element related to CSI report configuration and CSI resource configuration;

FIGS. 2A and 2B are diagrams to show an example of an RRC information element related to an NZP CSI-RS resource set and a CSI-SSB resource set;

FIG. 3 is a diagram to show an example of an RRC information element related to a TCI state;

FIG. 4 is an excerpt of an RRC information element "CSI-ReportConfig";

FIG. 5 is a diagram to show an example of a CSI report in Rel-15 NR;

FIGS. 11A to 11C are each a diagram to show an example in which the configuration of Embodiment 3-1 is applied to mode 1 for multiple group-based beam reporting;

FIGS. 12A to 12C are each a diagram to show an example in which the configuration of Embodiment 3-1 is applied to mode 2 for multiple group-based beam reporting;

FIGS. 13A to 13C are each a diagram to show an example of configuration of Embodiment 3-2;

DESCRIPTION OF EMBODIMENTS (CSI)

Figure 6B:
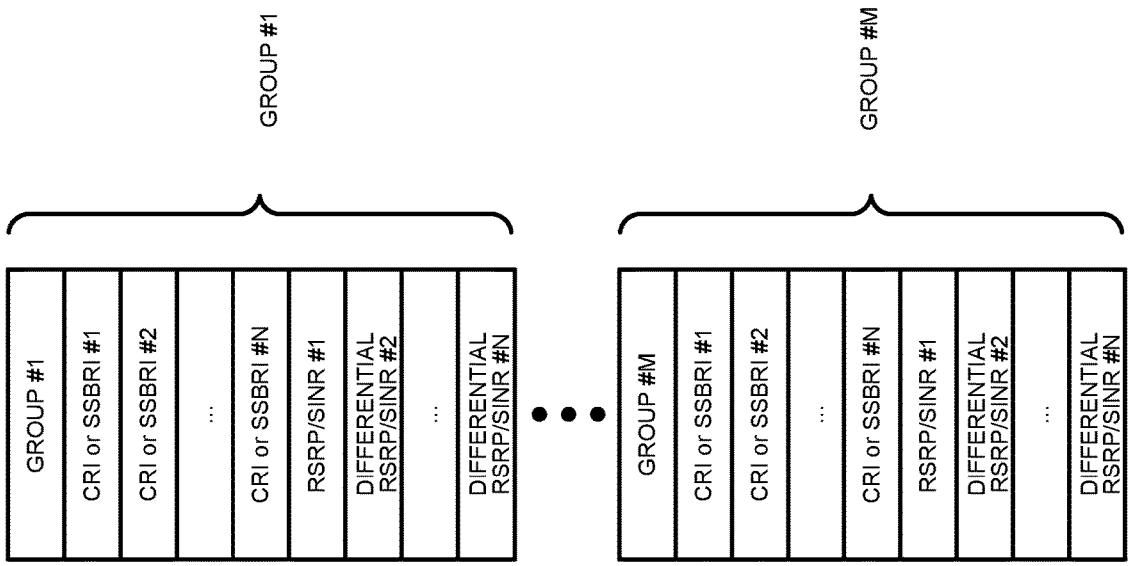
FIGS. 6A and 6B are each a diagram to show an example of a CSI report for multiple group-based beam reporting according to a first embodiment.

In NR, a UE measures a channel state by using a reference signal (or a resource for the reference signal), and feeds back (reports) channel state information (CST) to a network (for example, a base station).

The UE may measure the channel state by using at least one of a channel state information reference signal (CSI-RS), a synchronization signal/broadcast channel (Synchronization Signal/Physical Broadcast Channel (SS/PBCH)) block, a synchronization signal (SS), a demodulation reference signal (DMRS), and the like.

A CSI-RS resource may include at least one of a non-zero power (NZP) CSI-RS resource, a zero power (ZP) CSI-RS resource, and a CSI interference measurement (CSI-IM) resource.

A resource for measuring a signal component for the CSI may be referred to as a signal measurement resource (SMR) or a channel measurement resource (CMR). The SMR (CMR) may include, for example, the NZP CSI-RS resource, SSB, and the like for channel measurement.

A resource for measuring an interference component for the CSI may be referred to as an interference measurement resource (IMR). The IMR may include, for example, at least one of the NZP CSI-RS resource, SSB, ZP CSI-RS resource, and CSI-IM resource for interference measurement.

The SS/PBCH block is a block including a synchronization signal (for example, a primary synchronization signal (PSS) or a secondary synchronization signal (SSS)) and a PBCH (and a corresponding DMRS), and may be referred to as an SS block (SSB) and so on.

Note that the CSI may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), L1-RSRP (reference signal received power in layer 1, Layer 1 Reference Signal Received Power), L1-RSRQ (Reference Signal Received Quality), an L1-SINR (Signal to Interference plus Noise Ratio), an L1-SNR (Signal to Noise Ratio), and the like.

The CSI may have a plurality of parts. CSI part 1 may include information with a relatively small number of bits (for example, the RI). CSI part 2 may include information with a relatively large number of bits (for example, the CQI), such as information determined on the basis of CSI part 1.

The CSI may be classified into some CSI types. An information type, size, and the like to be reported may differ depending on the CSI type. For example, a CSI type configured for performing communication using a single beam (also referred to as type 1 (type I) CSI, CSI for a single beam, and so on), and a CSI type configured for performing communication using multiple beams (also referred to as type 2 (type II) CSI, CSI for multiple beams, and so on) may be defined. The usage of the CSI type is not limited to this.

As a method for feeding back the CSI, periodic CSI (P-CSI) reporting, aperiodic CSI (A-CSI) reporting, semi-persistent CSI (SP-CSI) reporting, and the like are under study.

CSI measurement configuration information may be notified to the UE with use of higher layer signaling, physical layer signaling, or a combination of these.

In the present disclosure, the higher layer signaling may be, for example, any one or combinations of Radio Resource Control (RRC) signaling, Medium Access Control (MAC)) signaling, broadcast information, and the like.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

The CSI measurement configuration information may be configured with use of, for example, an RRC information element "CSI-MeasConfig." The CSI measurement configuration information may include CSI resource configuration information (an RRC information element "CSI-ResourceConfig"), CSI report configuration information (an RRC information element "CSI-ReportConfig"), and the like. The CSI resource configuration information relates to a resource for CSI measurement, and the CSI report configuration information relates to how the UE performs CSI reporting.

FIGS. 1A and 1B are diagrams to show an example of an RRC information element related to the CSI report configuration and the CSI resource configuration. The present examples show an excerpt of a field (which may be referred to as a parameter) included in the information element. FIGS. 1A and 1B are illustrated with use of ASN.1 (Abstract Syntax Notation One) notation. Note that drawings related to other RRC information elements (or RRC parameters) of the present disclosure are also described with similar notation.

As shown in FIG. 1A, the CSI report configuration information ("CSI-ReportConfig") includes channel measurement resource information ("resourcesForChannelMeasurement"). The CSI report configuration information may include interference measurement resource information (for example, interference measurement NZP CSI-RS resource information ("nzp-CSI-RS-ResourcesForInterference"), interference measurement CSI-IM resource information ("csi-IM-ResourcesForInterference"), and the like). These pieces of resource information correspond to CSI resource configuration information IDs (Identifiers) ("CSI-ResourceConfigId").

Note that one or a plurality of the CSI resource configuration information IDs (which may be referred to as CSI resource configuration IDs) corresponding to respective pieces of resource information may be the same value, or the IDs may be values different from each other.

As shown in FIG. 1B, the CSI resource configuration information ("CSI-ResourceConfig") may include a CSI resource configuration information ID, CSI-RS resource set list information ("csi-RS-ResourceSetList"), a resource type ("resourceType"), and the like. The CSI-RS resource set list may include at least one of information about an NZP CSI-RS and SSB for measurement ("nzp-CSI-RS-SSB") and CSI-IM resource set list information ("csi-IM-ResourceSetList").

The resource type represents behavior of a time domain of this resource configuration, and "aperiodic," "semi-persistent," and "periodic" can be configured for the resource type. For example, CSI-RSs corresponding to "aperiodic," "semi-persistent," and "periodic" may be referred to as an A-CSI-RS, an SP-CSI-RS, and a P-CSI-RS, respectively.

Note that the channel measurement resource may be used, for example, for calculation of the CQI, PMI, L1-RSRP, and the like. The interference measurement resource may be used for calculation of the L1-SINR, L1-SNR, L1-RSRQ, and other interference-related indicators.

When the interference measurement is performed with CSI-IM, each CSI-RS for channel measurement may be associated with the CSI-IM resource in terms of resources on the basis of an order of the CSI-RS resource and CSI-IM resource in a corresponding resource set.

The "nzp-CSI-RS-SSB" may include NZP CSI-RS resource set list information ("nzp-CSI-RS-Resource-SetList") and SSB resource set list information for CSI measurement ("csi-SSB-ResourceSetList"). Each of these pieces of list information corresponds to one or more NZP CSI-RS resource set IDs ("NZP-CSI-RS-ResourceSetId") and CSI-SSB resource set IDs ("CSI-SSB-ResourceSetId"), and may be used for identifying a resource as a measurement target.

FIGS. 2A and 2B are diagrams to show an example of an RRC information element related to the NZP CSI-RS resource set and CSI-SSB resource set.

As shown in FIG. 2A, the NZP CSI-RS resource set information ("NZP-CSI-RS-ResourceSet") includes the NZP CSI-RS resource set ID and one or more NZP CSI-RS resource IDs ("NZP-CSI-RS-ResourceId").

NZP CSI-RS resource information ("NZP-CSI-RS-Resource") may include the NZP CSI-RS resource ID and an ID ("TCI-stateId") of a transmission configuration indication state (TCI state). The TCI state will be described later.

As shown in FIG. 2B, CSI-SSB resource set information ("CSI-SSB-ResourceSet") includes the CSI-SSB resource set ID and one or more pieces of SSB index information ("SSB-Index"). The SSB index information is, for example, an integer from 0 to 63, and may be used for identifying the SSB in an SS burst.

FIG. 3 is a diagram to show an example of an RRC information element related to the TCI state.

The TCI state is information related to quasi-co-location (QCL) of a channel or a signal, and may be referred to as a spatial reception parameter, spatial relation in (spatial relation info), and so on. The TCI state may be configured or specified for the UE for each channel or for each signal.

As shown in FIG. 3, TCI state information ("TCI-State") may include a TCI state ID and one or more pieces of QCL information ("QCL-Info"). The QCL information may include at least one of information related to a reference signal of a QCL source (RS-related information "referenceSignal") and information indicating a QCL type (QCL type information ("qcl-Type")). The RS-related information may include information such as an index of the RS (for example, an NZP CSI-RS resource ID or an SSB index), an index of a serving cell, and an index of a BWP (Bandwidth Part) in which the RS is located.

For at least one of a signal and a channel (expressed as a signal/channel), the UE may control reception processing (for example, at least one of reception, demapping, demodulation, decoding, determination of a receive beam, and the like), transmission processing (for example, at least one of transmission, mapping, modulation, coding, determination of a transmit beam, and the like), and the like on the basis of a TCI state corresponding to a TCI state ID associated with the signal/channel.

Note that in the present disclosure, "A/B" may mean "at least one of A and B."

As shown in FIG. 2A, for the P-CSI-RS, a TCI state related thereto may be configured by RRC. Note that for the P-CSI-RS, SP-CSI-RS, and A-CSI-RS, the TCI state related to these may be judged on the basis of higher layer signaling, physical layer signaling, or a combination of these.

(Beam Management)

For Rel-15 NR, a beam management (BM) method has been studied. In the beam management, beam selection performed on the basis of the L1-RSRP reported by the UE is under study. Changing (switching) a beam of a given signal/channel may correspond to changing at least one of a TCI state and QCL assumption for the signal/channel.

The UE may report (transmit) a measurement result for the beam management by using an uplink control channel (Physical Uplink Control Channel (PUCCH)) or an uplink shared channel (Physical Uplink Shared Channel (PUSCH)). The measurement result may be, for example, CSI including at least one of the L1-RSRP, L1-RSRQ, L1-SINR, L1-SNR, and the like.

The measurement result (for example, the CSI) reported for the beam management may be referred to as beam measurement, a beam measurement report, beam reporting (beam report), beam report CSI, and so on.

CSI measurement for the beam report may include interference measurement. The UE may measure channel quality, interference, and the like by using a resource for the CSI measurement to derive the beam report.

The beam report may include a result of at least one of channel quality measurement and interference measurement. The result of the channel quality measurement may include, for example, the L1-RSRP. The result of the interference measurement may include the L1-SINR, L1-SNR, L1-RSRQ, other interference-related indicators (for example, an arbitrary indicator other than the L1-RSRP), and the like.

The CSI report configuration information with consideration of beam management of present NR will be described with reference to FIG. 4. FIG. 4 is an excerpt of an RRC information element "CSI-ReportConfig." FIG. 4 illustrates an excerpt of another part of the same CSI report configuration information (CSI-ReportConfig) as that of FIG. 1A.

The CSI report configuration information may include a "report quantity" (which may be represented by an RRC parameter "reportQuantity") that is information about a parameter reported by one report instance (for example, one piece of CSI). The report quantity is defined by an ASN.1 object type "choice type (choice)." Thus, one of parameters (cri-RSRP, ssb-Index-RSRP, and the like) defined as the report quantity is configured.

With respect to each report configuration (report setting), the UE for which a higher layer parameter (for example, an RRC parameter "groupBasedBeamReporting" related to group-based beam reporting) included in the CSI report configuration information is configured to be disabled may include, in a beam report (one report instance), different numbers of beam measurement resource IDs (for example, SSBRIs and CRIs) of a higher layer parameter (for example, an RRC parameter "nrofReportedRS" indicating the number of RSs to be reported) included in the CSI report configuration information and measurement results (for example, L1-RSRP) corresponding to respective IDs.

With respect to each report configuration, the UE for which the groupBasedBeamReporting has been configured to be enabled may include two different beam measurement resource IDs and two measurement results (for example, L1-RSRP) corresponding to the respective IDs in the beam report. In other words, the UE for which the groupBasedBeamReporting has been configured to be enabled divides DL-RSs (for example, CSI-RSs) into two groups, and reports an ID and a measurement value with respect to an upper RS in each of the groups. Note that the two beam measurement resources (CSI-RS resources, SSB resources) may be simultaneously received by the UE with use of one spatial domain reception filter, or may be simultaneously received by the UE with use of a plurality of simultaneous spatial domain reception filters.

The NZP CSI-RS resource set information shown in FIG. 2A may include information related to repetition in resources in the resource set. The information related to the repetition may indicate, for example, 'ON' or 'OFF.' Note that 'ON' may be represented as 'enabled (or valid),' 'OFF' may be represented as 'disabled (or invalid).'

For example, for a resource set for which the repetition is configured as 'ON,' the UE may assume that resources in the resource set have been transmitted with use of the same downlink spatial domain transmission filter. In this case, the UE may assume that the resources in the resource set have been transmitted with use of the same beam (with use of, for example, the same beam from the same base station).

For a resource set for which the repetition is configured as 'OFF,' control may be performed in which the UE is prohibited to assume (or may not assume) that resources in the resource set have been transmitted with use of the same downlink spatial domain transmission filter. In this case, the UE may assume that the resources in the resource set are not transmitted with use of the same beam (the resources have been transmitted with use of different beams). In other words, for the resource set for which the repetition is configured as 'OFF,' the UE may assume that the base station is performing beam sweeping.

In Rel-15 NR, the cri-RSRP and ssb-Index-RSRP out of the report quantity are related to the beam management. The UE for which the cri-RSRP has been configured as the report quantity reports a CRI and L1-RSRP corresponding to the CRI. The UE for which the ssb-index-RSRP has been configured as the report quantity reports an SSBRI and L1-RSRP corresponding to the SSBRI.

FIG. 5 is a diagram to show an example of a CSI report in Rel-15 NR. FIG. 5 shows the order of mapping of CSI fields included in one CSI report (n-th CSI report #n) for a CSI/RSRP or SSBRI/RSRP report, as defined in Table 6.3.1.1.2-8 of 3GPP TS 38.212 V15.7.0.

The CSI report of FIG. 5 can include one or more combinations of a CRI/SSBRI and RSRP. The number of these combinations may be configured by a higher layer parameter (for example, an RRC parameter "nrofReportedRS") indicating the number of reference signal resources as reported targets.

When the nrofReportedRS is set to 1 ('n1' as a value) for an L1-RSRP report, RSRP #1 that is a field with a given number of bits (for example, m bits) indicating L1-RSRP with the highest measurement value is included in the CSI report. In Rel-15 NR, m=7.

When the nrofReportedRS greater than 1 is configured for the L1-RSRP report or when the groupBasedBeamReporting is configured to be enabled for the L1-RSRP report, the UE uses a differential L1-RSRP-based report. Specifically, the UE includes, in the same CSI report (reporting instance), RSRP #1 indicating the L1-RSRP with the highest measurement value and differential RSRP #k calculated (as, for example, difference from the measurement value by reference to the highest measurement value with respect to the k-th (in FIG. 5, k=2, 3, and 4) highest L1-RSRP. Here, differential RSRP #k may be a field with bits (for example, n bits) less than the above-described given number. In Rel-15 NR, n=4.

Note that when the groupBasedBeamReporting is configured to be enabled, the UE includes RSRP #1 and differential RSRP #2 in the same CSI report.

CRI/SSBRI #k of FIG. 5 is a field indicating a CRI/SSBRI corresponding to RSRP #k or differential RSRP #k (is included in a case where RSRP #k or differential RSRP #k is reported).

Note that in Rel-16 (or later versions of) NR, the nrofReportedRS may be a value greater than or equal to 4, or may be 4 or more. The CSI report may include 4 or more combinations of a CRI/SSBRI and RSRP. The above-described m, n, and the like are not limited to 7, 4, respectively.

Incidentally, for future radio communication systems (for example, Rel-17 NR), beam management-related enhancement with respect to a user terminal (User Equipment (UE)) having a plurality of panels (multiple panels), a plurality of transmission/reception points (multi-Transmission/Reception Points (TRPs)), and the like (for example, a beam report suitable for multiple TRPs) is under study.

The above-mentioned groupBasedBeamReporting can report two groups with one report, and thus is desirable to a case where multi-TRP transmission, multi-panel reception, and the like are applied. For example, the groupBasedBeamReporting can be used for reporting the best beam of TRP 1 as RSRP #1 and the best beam of TRP 2 as differential RSPF #2.

For Rel-16 NR, introduction of an L1-SINR report is under study. With respect to calculation of the L1-SINR, for the UE, at least one of an NZP CSI-RS resource and an SSB resource may be configured for channel measurement and at least one of an NZP CSI-RS resource and a CSI-IM resource may be configured for interference measurement.

The UE for which the cri-SINR has been configured as the report quantity reports a CRI and an L1-SINR corresponding to the CRI. The UE for which the ssb-Index-SINR has been configured as the report quantity reports an SSBRI and an L1-SINR corresponding to the SSBRI.

With respect to each report configuration (report setting), the UE for which a higher layer parameter (for example, an RRC parameter "groupBasedBeamReporting" related to group-based beam reporting) included in the CSI report configuration information is configured to be disabled may include, in a beam report (one or a plurality of report instances), different numbers of beam measurement resource IDs (for example, SSBRIs and CRIs) of a higher layer parameter (for example, an RRC parameter "nrofReportedRSForSINR" indicating the number of RSs to be reported with respect to SINRs) included in the CSI report configuration information and measurement results (for example, L1-SINRs) corresponding to respective IDs.

With respect to each report configuration, the UE for which the groupBasedBeamReporting has been configured to be enabled may include two different beam measurement resource IDs and two measurement results (for example, L1-SINRs) corresponding to the respective IDs in the beam report. Note that the two beam measurement resources (CSI-RS resources, SSB resources) may be simultaneously received by the UE with use of one spatial domain reception filter, or may be simultaneously received by the UE with use of a plurality of simultaneous spatial domain reception filters.

Note that the groupBasedBeamReporting for an SINR report may be interpreted as a parameter, such as "groupBasedBeamReportingForSINR."

When the nrofReportedRSForSINR is configured to 1 ('n1' as a value) for the L1-SINR report, SINR #1 that is a 7-bit field indicating an L1-SINR with the highest measurement value is included in the CSI report.

When the nrofReportedRSForSINR greater than 1 is configured for the L1-SINR report, the UE uses a differential L1-SINR-based report. Specifically, the UE includes, in the same CSI report (reporting instance), SINR #1 indicating the L1-SINR with the highest measurement value and differential SINR #k calculated (as, for example, difference from the measurement value) by reference to the highest measurement value with respect to the k-th (k=2, 3, and 4) highest L1-SINR. Here, differential SINR #k may be a 4-bit field.

Note that SINR #1 may correspond to a value quantized to 7 bits by a step size of 0.5 dB in a range from −23 dB to 40 dB. Differential SINR #k may correspond to a value quantized to 4 bits by a step size of 1 dB. Note that the range, step size, and the like of each value are not limited to these.

As mentioned above, in Rel. 15 and Rel. 16, the UE for which the group-based beam reporting is configured to be enabled can report only two different CRIs/SSBRIs (which may be interpreted as beam indices) with respect to each report configuration. Thus, for Rel. 17, allowing the number of groups capable of being reported by the group-based beam reporting to be greater than 2 is under study.

However, a study of a method for appropriately judging which beam index the UE can simultaneously receive has not yet proceeded. Unless this is clarified, for example, the base station simultaneously transmits beams incapable of being simultaneously received by the UE, and communication throughput may be reduced.

Thus, the inventors of the present invention also considered allowing the number of beam indices in the group to be greater than or equal to 2, and came up with the idea of a desirable CSI report configuration for the group-based beam reporting. The inventors of the present invention came up with the idea of a method for appropriately judging beams capable of being simultaneously received by the UE, beams simultaneously transmitted by the base station, and the like.

Embodiments according to the present disclosure will be described in detail with reference to the drawings as follows. The radio communication methods according to respective embodiments may each be employed individually, or may be employed in combination.

Note that in the present disclosure, a panel, an Uplink (UL) transmission entity, a TRP, a spatial relation, a control resource set (Control REsource SET (CORESET)), a PDSCH, a codeword, a base station, an antenna port (for example, a demodulation reference signal (DMRS) port), an antenna port group (for example, a DMRS port group), a group (for example, a code division multiplexing (CDM) group, a reference signal group, a CORESET group, or a CORESET pool), and the like may be interchangeably interpreted. For example, a panel Identifier (ID) and a panel may be interchangeably interpreted. A TRP ID and a TRP may be interchangeably interpreted.

Note that in the present disclosure, the group and each of a set, a cluster, a panel, a group related to a (reported) beam, and the like may be interchangeably interpreted.

In embodiments below, a beam index may be interpreted as, for example, a CRI/SSBRI. RSRP/SINR may be interpreted as an arbitrary measurement result related to a beam.

The CSI-RS-related name may be interpreted as the SSB-related corresponding name. For example, a CSI-RS resource may be interpreted as an SSB resource. In other words, a CSI-RS may be interpreted as a CSI-RS/SSB, and CRI may be interpreted as CRI/SSBRI.

(Radio Communication Method)

First Embodiment

A UE for which group-based beam reporting (groupBasedBeamReporting) is configured to be enabled may report beam indices related to a plurality of (for example, M) groups with respect to each report configuration. A CSI report may include a plurality of (for example, N) beam indices with respect to each of the above-described M groups. The CSI report may explicitly include a group index indicating a group to be reported, or may implicitly include the group index.

Here, each of M and N may be defined by specifications beforehand, may be judged on the basis of UE capability (or reported UE capability information), or may be configured by higher layer signaling or the like.

For example, M may be configured by a higher layer parameter (for example, nrofReportedGroup) related to the number of groups as reported targets. N may be configured by a higher layer parameter (for example, nrofReportedRS) related to the number of RSs as reported targets.

M and N may be determined on the basis of the number of panels included by the UE, or may be determined on the basis of the number of TRPs (the number of configured TRPs) to perform transmission to the UE.

This M may mean the number of groups to be reported, or may mean a maximum number of groups capable of being reported. This N may mean the number of beam indices to be reported in a group, or may mean a maximum number of beam indices capable of being reported in the group. M may be greater than or equal to 2. N may be greater than or equal to 2. Note that N may differ for each group, and N corresponding to each group may be configured or determined.

Note that group-based beam reporting of a first embodiment may be referred to as multiple group-based beam reporting, multi-group-based beam reporting, group-based beam reporting of Rel. 17, and so on. The multiple group-based beam reporting may be performed in a case where a higher layer parameter (for example, groupBasedBeamReporting) indicating the group-based beam reporting, a higher layer parameter (for example, groupBasedBeamReporting-r17) indicating the group-based beam reporting of Rel. 17, or a higher layer parameter (for example, multipleGroupBasedBeamReporting) indicating the multiple group-based beam reporting is configured to be enabled.

Figure 6A:
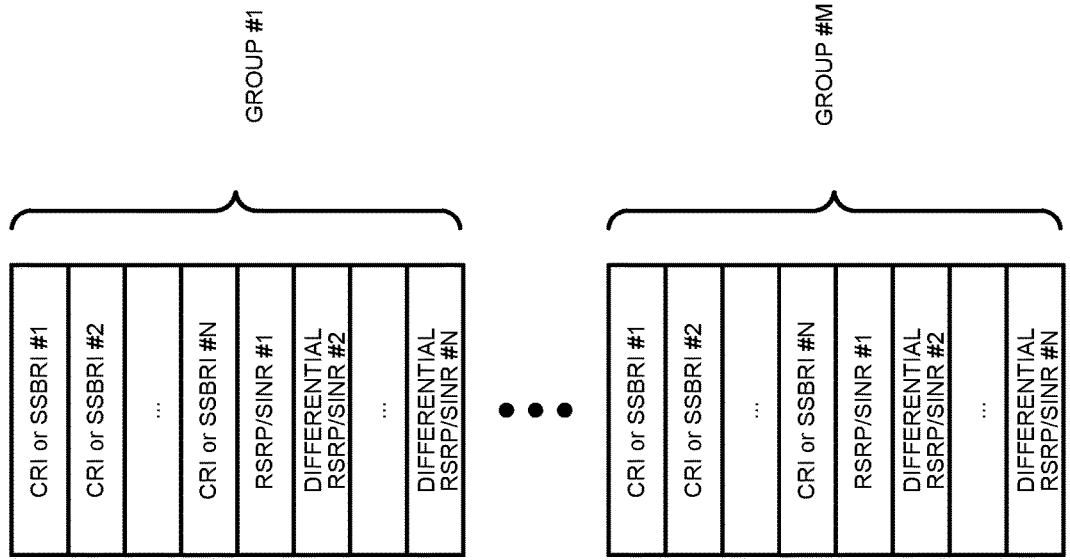

The UE for which the multiple group-based beam reporting has been configured may create a CSI report such as shown in FIG. 6A, FIG. 6B, or the like, and may transmit the CSI report to a network.

FIGS. 6A and 6B are each a diagram to show an example of the CSI report for the multiple group-based beam reporting according to the first embodiment. The present examples show fields included in the CSI report, but the order of the fields is not limited to these.

FIG. 6A shows the CSI report in which group indices are included implicitly. The CSI report includes field sets in units of groups in order from group #1 to group #M. The field set in units of groups includes N beam indices in the group and N RSRPs/SINRs and differential RSRPs/SINRs corresponding to the respective beam indices. The UE and a base station can judge which group a field in the CSI report corresponds to on the basis of a position of the field.

Note that in the present disclosure, the field sets in units of groups included in the CSI report may be referred to as reports in units of groups, group reports, and so on.

FIG. 6B shows the CSI report in which group indices are included explicitly. FIG. 6B differs from FIG. 6A in that a group index field indicating an index of the group is included immediately before the group report. Note that a position of the group index field is not limited to this.

In the present example, the group reports are included in order from group #1 to group #M, but the group index field is present, thereby allowing the group reports to be included in the CSI report in arbitrary order. For example, even when the UE reports a CSI report including group reports with respect to groups less than M groups (for example, groups selected from M groups), the base station can understand the reported groups appropriately.

Note that the group reports may include only differential RSRPs/SINRs as a measurement result. Differential RSRPs/SINRs included in a group report of a given group may be calculated by reference to SINR #1 of another group. The group reports may include only RSRPs/SINRs as a measurement result.

Hereinafter, RSRPs/SINRs included in the group reports in the present disclosure may be interpreted as normal RSRPs/SINRs (not being difference from another RSRP/SINR), or may be interpreted as differential RSRPs/SINRs.

Hereinafter, as an example of a beam index included in the group reports, a CRI will be used for description, but the CRI in the present disclosure may be interpreted as a CRI or SSBRI.

According to the first embodiment described above, the UE can preferably create and report a CSI report for group-based beam reporting with respect to a plurality of groups.

Second Embodiment

A second embodiment relates to the multiple group-based beam reporting mentioned in the first embodiment.

The second embodiment is broadly classified into two as follows:

Embodiment 2-1: a UE can simultaneously receive a plurality of beams belonging to different groups, and
Embodiment 2-2: the UE can simultaneously receive a plurality of beams belonging to the same group.

Figure 7:
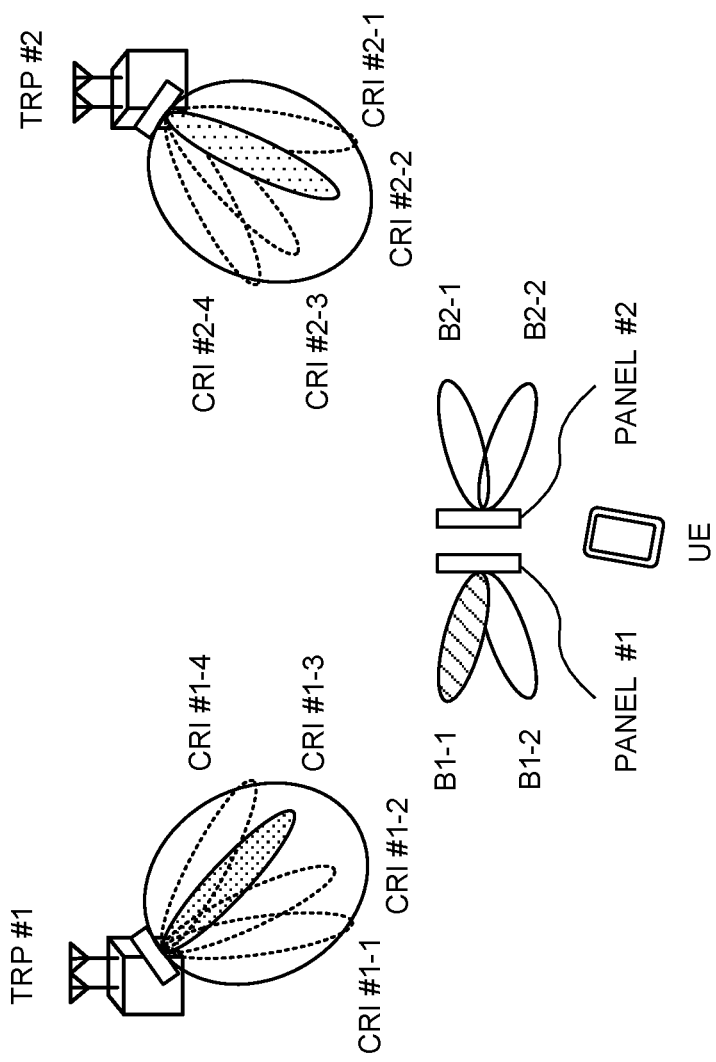
FIG. 7 is a diagram to show an example of a beam usage environment assumed in relation to multiple group-based beam reporting.

The second embodiment will be described with an environment of FIG. 7 as an example as follows. FIG. 7 is a diagram to show an example of a beam usage environment assumed in relation to the multiple group-based beam reporting.

In FIG. 7, the UE measures resources of reference signals (CSI-RSs) transmitted from two TRPs (TRP #1 and TRP #2). The UE has two panels (panel #1 and panel #2), and the respective panels can form different beams (B1-1, B1-2, B2-1, and B2-2).

TRP #1 transmits a CSI-RS by using resources of CRI #1-1 to CRI #1-4 corresponding to different beams. TRP #2 transmits a CSI-RS by using resources of CRI #2-1 to CRI #2-4 corresponding to different beams. In the present disclosure, beams of CRI #1-1 to CRI #1-4 and transmit beams #1 to #4, respectively, may be interchangeably interpreted. In the present disclosure, beams of CRI #2-1 to CRI #2-4 and transmit beams #5 to #8, respectively, may be interchangeably interpreted.

Note that each TRP and the UE may perform transmission and reception by sweeping respective beams (by using different times/frequencies), or may perform transmission and reception by simultaneously using some beams.

Note that FIG. 7 is just an example, and, for example, TRP #1 and TRP #2 may be interpreted as two panels (panel #1 and panel #2) of a given TRP.

Embodiment 2-1 and Embodiment 2-2 will be described together with a specific example of a CSI report for the multiple group-based beam reporting mentioned above in FIGS. 6A and 6B as follows. The UE transmits the CSI report to at least one of TRP #1 and TRP #2.

RSRPs/SINRs corresponding to CRI #1-1 to CRI #1-4 may be denoted as RSRP/SINR #1-1 to RSRP/SINR #1-4, respectively. RSRPs/SINRs corresponding to CRI #2-1 to CRI #2-4 may be denoted as RSRP/SINR #2-1 to RSRP/SINR #2-4, respectively.

Hereinafter, a resource corresponding to a given CRI may be simply denoted as a given CRI (for example, CRI #1-1 may mean CRI #1-1, or may mean a resource corresponding to CRI #1-1).

Embodiment 2-1

In Embodiment 2-1, in relation to beam indices to be reported in a given group, the UE may not expect simultaneous reception of these beams (based on corresponding TCI states) (or may assume that the simultaneous reception fails).

In Embodiment 2-1, the UE can simultaneously receive these beams (on the basis of corresponding TCI states) in relation to beam indices to be reported with respect to a plurality of different groups.

Note that in the present disclosure, simultaneous reception of respective beams related to a plurality of beam indices may mean simultaneous reception of beam measurement resources (CSI-RS resources, SSB resources) corresponding to these beam indices with use of one or a plurality of spatial domain reception filters.

A group report in Embodiment 2-1 may be configured in accordance with a rule similar to that in a case where group-based beam reporting is configured to be disabled in Rel. 15/16. For example, the group report may include beam indices the number of which is nrofReportedRS and corresponding RSRPs/SINRs.

For example, the UE may perform measurement by using different panels/antennas/transceiver units (TXRUs) (or panel/antenna/TXRU group). Beam indices in the group may mean beams measured by the same panel/antenna/TXRU. In this case, the group is the same meaning as the panel/antenna/TXRU.

With respect to multi-TRP transmission, a network may select a plurality of beams from beams of different groups so as to transmit beams with a guarantee that the UE can perform simultaneous reception.

In Embodiment 2-1, the UE may guarantee that beams of the different groups are (or can be) simultaneously received. Note that the network may be able to simultaneously transmit a plurality of arbitrary beams from the different groups, or may be unable to perform the simultaneous transmission.

Embodiment 2-2

In Embodiment 2-2, unlike Embodiment 2-1, in relation to beam indices to be reported in a given group, the UE can simultaneously receive these beams (on the basis of corresponding TCI states).

In Embodiment 2-2, the UE may not expect reception of these beams (based on corresponding TCI states) (or may assume that the simultaneous reception fails) in relation to beam indices to be reported with respect to a plurality of different groups.

A plurality of beams corresponding to the reported beam indices in the group correspond to a combination of fine beams recommended by the UE. In other words, these beams have a desirable relationship, such as lower inter-beam interference, higher spatial isolation, or a longer antenna distance.

The UE having a plurality of panels may perform measurement by using different panels by turns (or alternately). Beam indices in the group may mean beams measured by the same panel/antenna/TXRU. The UE may include results of measurement of beams measured by these different panels in the same group report, or may include the results in the same CSI report. How to include the beam measurement results in the CSI report may be determined depending on implementation. Measurement using such different panels by turns may be applied to either or both of L1-RSRP-based beam reporting and L1-SINR-based beam reporting.

The UE having a plurality of panels may perform measurement by simultaneously using all panels (by using, for example, one TXRU group from each panel). The UE may determine, on the basis of the above-described measurement, a fine combination of transmit beams with lower inter-beam interference. Specific behavior of the measurement will be described later. Such measurement simultaneously using all panels may be applied to, for example, L1-SINR-based beam reporting.

{Examples of CSI Reports of Embodiments 2-1 and 2-2}

Figure 8B:
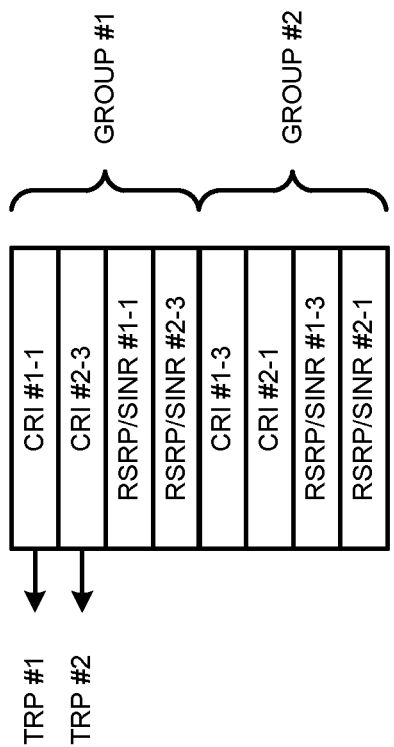
FIGS. 8A and 8B are diagrams to show an example of a CSI report of Embodiment 2-1 and an example of a CSI report of Embodiment 2-2, respectively.
Figure 8A:
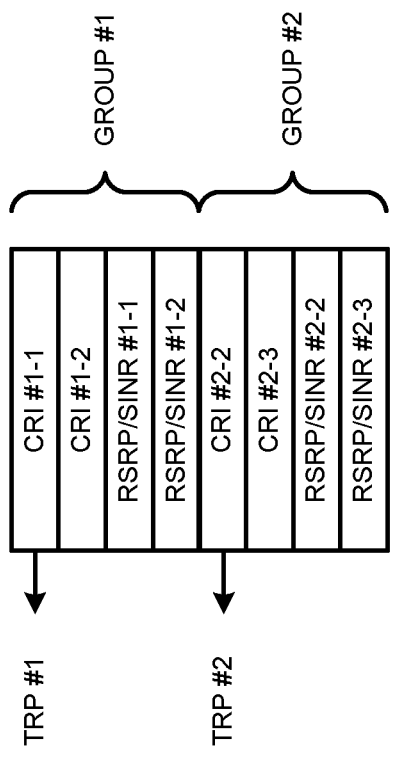

FIGS. 8A and 8B are diagrams to show an example of the CSI report of Embodiment 2-1 and an example of the CSI report of Embodiment 2-2, respectively. The present examples assume that M and N mentioned in the first embodiment are each 2.

As an example of Embodiment 2-1, the UE has reported, to a network (for example, a TRP), a CSI report of FIG. 8A that the best CRI is CRI #1-1 and the second best CRI is CRI #1-2 with respect to group #1 and that the best CRI is CRI #2-2 and the second best CRI is CRI #2-3 with respect to group #2.

A base station that has received the CSI report may select CRI #1-1 from group #1 and select CRI #2-2 from group #2 for multi-TRP/multi-panel transmission.

The group may correspond to the TRP, and in this case, the TRP can grasp the best beam of one panel of the UE in one-to-one correspondence by using one group report. In the CSI report of FIG. 8A, the group corresponds to the TRP.

As an example of Embodiment 2-2, the UE has reported, to a network (for example, a base station), a CSI report of FIG. 8B that the best CRI is CRI #1-1 and the second best CRI is CRI #2-3 with respect to group #1 and that the best CRI is CRI #1-3 and the second best CRI is CRI #2-1 with respect to group #2.

The base station that has received the CSI report may select CRI #1-1 and CRI #2-3 from group #1 for multi-TRP/multi-panel transmission.

The group may correspond to a plurality of TRPS (or a plurality of panels). In other words, the group report may include beam indices corresponding to the plurality of TRPs (or the plurality of panels).

As described above, the group report may include beam indices corresponding to only one TRP (or one panel), or may include beam indices corresponding to a plurality of TRPs (or a plurality of panels). Information related to whether a given group report includes beam indices corresponding to only one TRP (or one panel) may be notified to the UE with use of higher layer signaling or the like.

Note that the multiple group-based beam reporting (to report a CSI report without assumption about simultaneous reception of beams with beam indices in the group) of Embodiment 2-1 may be referred to as mode 1 for multiple group-based beam reporting.

The multiple group-based beam reporting (to report a CSI report capable of simultaneously receiving beams with beam indices in the group) of Embodiment 2-2 may be referred to as mode 2 for multiple group-based beam reporting.

Either of the above-described mode 1 and mode 2 may be supported by the UE, or both of the above-described mode 1 and mode 2 may be supported.

According to the second embodiment described above, the UE can appropriately judge that beams belonging to which group can be simultaneously received in relation to group-based beam reporting.

Third Embodiment

A third embodiment relates to configuration of the multiple group-based beam reporting mentioned in the second embodiment.

Figure 9A:
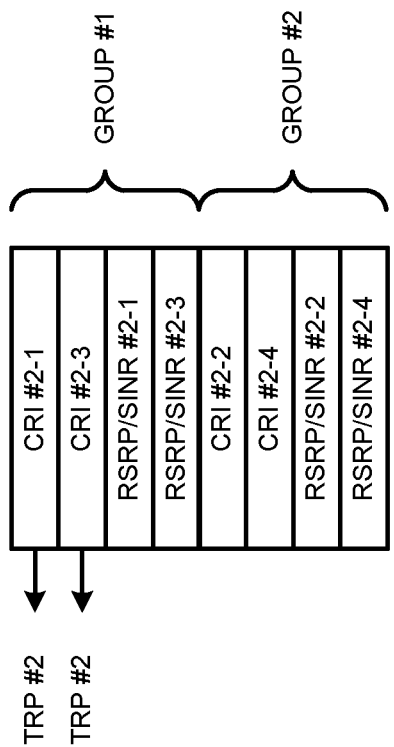
FIGS. 9A and 9B are diagrams to show an example of concerns about the CSI report of Embodiment 2-1 and an example of concerns about the CSI report of Embodiment 2-2, respectively.
Figure 9B:
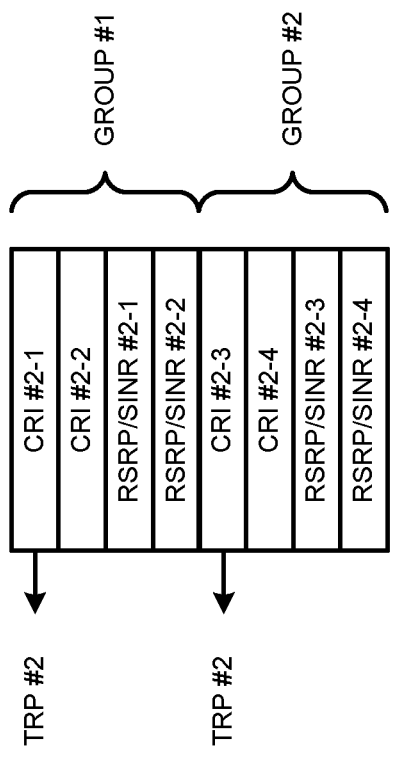

When a UE does not know which transmit beam (CRI) corresponds to which TRP, the UE may include, in a CSI report, only CRIs related to the same TRP. FIGS. 9A and 9B are diagrams to show an example of concerns about the CSI report of Embodiment 2-1 and an example of concerns about the CSI report of Embodiment 2-2, respectively.

In both of the examples, all of reported CRIs correspond to TRP #2. With respect to FIG. 9A, reported transmit beams across different groups are transmitted from the same TRP. With respect to FIG. 9B, reported transmit beams in the same group are transmitted from the same TRP.

When the TRP fails to simultaneously transmit a plurality of transmit beams (for example, the TRP adopts beam sweeping), the above-described CSI report is inappropriate for multi-TRP transmission. In other words, a combination of beams capable of being simultaneously received by the UE does not necessarily correspond to a combination of beams capable of being simultaneously transmitted by a network side (TRP).

Thus, as the third embodiment, the inventors of the present invention considered the combination of beams capable of being simultaneously transmitted by the TRP, and came up with the idea of configuration for allowing the UE to report a CSI report.

The third embodiment is broadly classified into two as follows:

Embodiment 3-1: a plurality of (up to P) CSI resource configurations (CSI-ResourceConfig) are configured for the UE in association with one CSI report configuration (CSI-ReportConfig), Embodiment 3-2: a plurality of (up to P) CSI-RS resource sets (for example, NZP-CSI-RS-ResourceSet) are associated with one CSI resource configuration (CSI-ResourceConfig) configured for the UE in association with one CSI report configuration (CSI-ReportConfig), Embodiment 3-3: CSI-RS resources (for example, NZP-CSI-RS-Resource) of a plurality of (up to P) groups are associated with one CSI-RS resource set (for example, NZP-CSI-RS-ResourceSet) associated with one CSI resource configuration (CSI-ResourceConfig) configured for the UE in association with one CSI report configuration (CSI-ReportConfig), and Embodiment 3-4: CSI-RS ports of a plurality of (up to P) groups are associated with one CSI-RS resource (for example, NZP-CSI-RS-Resource) in one CSI-RS resource set (for example, NZP-CSI-RS-ResourceSet) associated with one CSI resource configuration (CSI-ResourceConfig) configured for the UE in association with one CSI report configuration (CSI-ReportConfig).

Embodiment 3-1

In Embodiment 3-1, the following may be employed in relation to each CSI resource configuration:
- the number of CSI-RS resource sets configurable for the CSI resource configuration is up to 1 when a resource type (resourceType) is periodic/semi-persistent, and
- the number of CSI-RS resource sets configurable for the CSI resource configuration is up to 16 when the resource type (resourceType) is aperiodic.

In Embodiment 3-1, the following may be employed in relation to each CSI-RS resource set:
- the number K of CSI-RS resources in one CSI-RS resource set is up to 64, and
- a total number of different CSI-RS resources with respect to all CSI-RS resource sets is 128 or 128*P.

With respect to given CSI resource configuration, for a resource set for which repetition is configured as 'OFF,' the UE may assume that CSI-RS resources in the resource set are time division multiplexed (TDMed). Note that for the resource set for which repetition is configured as 'OFF,' the UE may assume that the CSI-RS resources in the resource set are necessarily TDMed and FDM is not applied.

The UE may assume that at least one of TDM and frequency division multiplexing (FDM) is applied to CSI-RS resources between different CSI resource configurations (for example, CSI-RS resources of a first resource set and CSI-RS resources of a second resource set). In other words, it may be assumed that CSI-RS resources to be FDMed (for example, these are a plurality of CSI-RS resources other than QCL type D (QCL-D)) are allowed across only different CSI resource configurations.

In Embodiment 3-1, one CSI resource configuration may correspond to one TRP.

For a plurality of resource sets for which repetition is configured as 'OFF,' the UE may assume that CSI-RS resources between the plurality of resource sets are necessarily TDMed and FDM is not applied. For a resource set for which repetition is configured as 'OFF,' the UE may assume that at least one of TDM and FDM is applied to CSI-RS resources in the resource set. In this case, one CSI resource configuration may correspond to a plurality of TRPs.

Figures 10A, 10B:
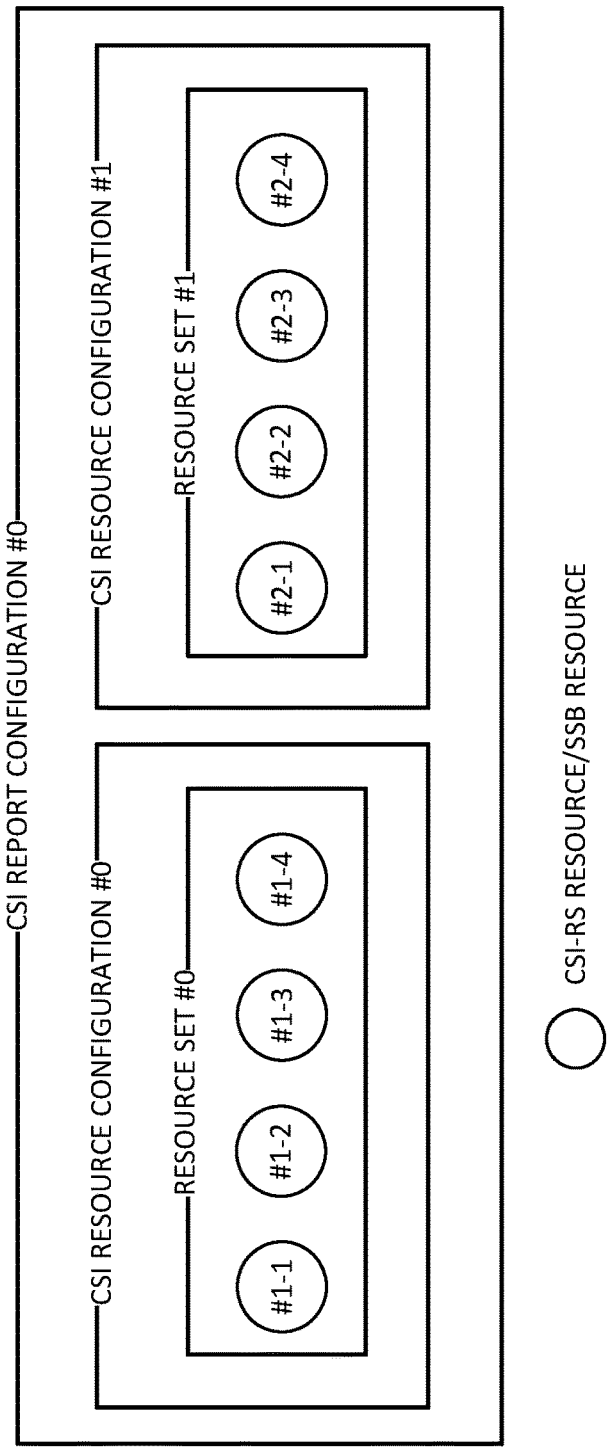
FIGS. 10A and 10B are each a diagram to show an example of configuration of Embodiment 3-1.

FIGS. 10A and 10B are each a diagram to show an example of configuration of Embodiment 3-1.

FIG. 10A is an example of CSI-related configuration configured for the UE. In the present example, CSI report configuration #0 includes CSI resource configurations #0 and #1. CSI resource configuration #0 is related to resource set #0 (CSI-RS resource set #0), and four CSI-RS resources corresponding to CRI #1-1 to CRI #1-4 are configured in this resource set #0. CSI resource configuration #1 is related to resource set #1 (CSI-RS resource set #1), and four CSI-RS resources corresponding to CRI #2-1 to CRI #2-4 are configured in this resource set #1.

Assuming that FIG. 10A corresponds to the example of FIG. 7, repetition='OFF' is configured for both resource sets #0 and #1.

FIG. 10B is a diagram to show an example of CSI report configuration with RRC used for the configuration of Embodiment 3-1. FIG. 10B differs from CSI report configuration of existing Rel-15 NR of FIG. 1A in that channel measurement resource information (resourcesForChannelMeasurement) corresponds to a plurality of (up to maxNrofresourcesForChannelMeasurement) CSI resource configurations. Therefore, a CSI resource configuration related to a plurality of CMRs is configured for the UE in association with one CSI report configuration (CSI-ReportConfig).

When the UE has capability to support CSI-RS resources to be FDMed (or transmits information related to the capability), the CSI-RS resources to be FDMed may be configured for the UE.

When a plurality of FDMed CSI-RS resources other than QCL-D are configured, the UE may measure each CSI-RS resource by using different UE panels. For example, when CRI #1-1 and CRI #2-1 are configured, and these resources are FDMed and are anything other than QCL-D, the UE may measure these resources by using different panels.

Note that if the plurality of FDMed CSI-RS resources other than QCL-D correspond to the same panel of the UE, the UE may drop (may not perform) measurement of at least one of these CSI-RS resources. The UE may assume that the CSI-RS resource with dropped measurement is a CSI-RS resource corresponding to at least one of the following:
- Resource corresponding to specific (for example, highest/lowest) CSI-RS resource ID, and
- Resource corresponding to specific (for example, highest/lowest) measurement value (RSRP/RSRQ/SINR).

The UE may perform measurement of a non-dropped CSI-RS resource by using the above-described panel.

If the plurality of FDMed CSI-RS resources other than QCL-D correspond to the same panel of the UE, the UE may perform measurement of at least one of these CSI-RS resources by using the above-described panel, and may perform measurement of at least one of the remaining CSI-RS resources by using another panel.

The UE may assume that the CSI-RS resource to be measured is a CSI-RS resource corresponding to at least one of the following:
- Resource corresponding to specific (for example, highest/lowest) CSI-RS resource ID, and
- Resource corresponding to specific (for example, highest/lowest) measurement value (RSRP/RSRQ/SINR).

The UE may assume that the CSI-RS resource measured with use of the above-described another panel is a CSI-RS resource corresponding to at least one of the following:
- Resource corresponding to specific (for example, second highest/second lowest) CSI-RS resource ID, and
- Resource corresponding to specific (for example, second highest/second lowest) measurement value (RSRP/RSRQ/SINR).

FIGS. 11A to 11C are each a diagram to show an example in which the configuration of Embodiment 3-1 is applied to mode 1 for multiple group-based beam reporting. The present example describes a case where the configuration of FIG. 10A is configured for the UE under the environment of FIG. 7. In the present example, the UE assumes that panel #1 is related to group #1 and panel #2 is related to group #2.

FIG. 11A shows an example of a result of measurement (for example, L1-RSRP/L1-SINR) of respective CRI (CRI #1-1 to CRI #1-4 and CRI #2-1 to CRI #2-4) measured with use of panel #1 and panel #2 of the UE, respectively.

FIG. 11B is a diagram to show an example of a CSI report in which the two best beams for each panel are selected for each group with respect to the case of FIG. 11A in a case where the configuration of Embodiment 3-1 is not applied (a case where TRPs are not related to the CSI resource configuration, for example, 8 resources from CRI #1-1 to CRI #1-4 and from CRI #2-1 to CRI #2-4 are simply associated with a CSI report configuration).

In this case, the UE has determined that, with respect to group #1 (panel #1), the best CRI is CRI #1-1 and the second best CRI is CRI #1-3, and has determined that, with respect to group #2 (panel #2), the best CRI is CRI #1-2 and the second best CRI is CRI #1-4 (with respect to reception panel

2, results of CRI #1-2 and CRI #2-2 are the same, and results of CRI #1-4 and CRI #2-3 are the same, but which result is to be selected depends on the UE).

Thus, when the configuration of Embodiment 3-1 is not applied, the UE may report CRIs from the same TRP across different groups. Therefore, the network fails to schedule, on the basis of the CSI report, two beams from the different groups with respect to multi-TRP transmission.

FIG. 11C is a diagram to show an example of a CSI report in which the two best beams from TRP #1 measured with use of panel #1 are selected and the two best beams from TRP #2 measured with use of panel #2 are selected with respect to the case of FIG. 11A in a case where the configuration of Embodiment 3-1 is applied (the configuration of FIG. 10A is configured).

In this case, the UE has determined that, with respect to group #1 (panel #1), the best CRI and the second best CRI out of CRIs in CSI resource configuration #0 related to TRP #1 are CRI #1-1 and CRI #1-3, respectively. The UE has determined that, with respect to group #2 (panel #2), the best CRI and the second best CRI out of CRIs in CSI resource configuration #1 related to TRP #2 are CRI #2-2 and CRI #2-3, respectively.

Thus, when the configuration of Embodiment 3-1 applied, the UE reports CRIs from different TRPs with respect to different groups. Therefore, the network can schedule, on the basis of the CSI report, two beams from the different groups with respect to multi-TRP transmission.

FIGS. 12A to 12C are each a diagram to show an example in which the configuration of Embodiment 3-1 is applied to mode 2 for multiple group-based beam reporting. The present examples describe a case where the configuration of FIG. 10A is configured for the UE under the environment of FIG. 7.

FIG. 12A is almost the same as FIG. 11A, but differs from FIG. 11A in that a result of measurement of CRI #2-2 and CRI #2-3 of reception panel #2 is worse than that of FIG. 11A.

FIG. 12B is a diagram to show an example of a CSI report in which the two best beams measured by different panels are selected for each group with respect to the case of FIG. 12A in a case where the configuration of Embodiment 3-1 is not applied.

In this case, the UE performs selection such that, with respect to group #1, the best CRI out of all CRIs is CRI #1-2 of panel #2 and the second best CRI belonging to a panel different from panel #2 is CRI #1-1 of panel #1. The CE performs selection such that, with respect to group #2, the best CRI out of the remaining CRIs is CRI #1-4 of panel #2 and the second best CRI belonging to a panel different from panel #2 is CRI #1-3 of panel #1.

Thus, when the configuration of Embodiment 3-1 is not applied, the UE may report CRIs from the same TRP in a group. Therefore, the network fails to schedule, on the basis of the CSI report, two beams from the same group with respect to multi-TRP transmission.

FIG. 12C is a diagram to show an example of a CSI report in which the best beam from one TRP measured with use of panel #1 and the best beam from the other TRP measured with use of panel #2 are selected for each group with respect to the case of FIG. 12A in a case where the configuration of Embodiment 3-1 is applied (the configuration of FIG. 10A is configured).

In this case, the UE performs selection such that, with respect to group #1, the best CRI out of CRIs corresponding to TRP #1 in reception panel #1 is CRI #1-1 and the best CRI out of TRP #2 different from TRP #1 in reception panel #2 is CRI #2-2. The UE performs selection such that, with respect to group #2, the best CRI out of CRIs corresponding to TRP #2 in reception panel #1 is CRI #2-3 and the best CRI out of CRIs of TRP #1 different from TRP #2 in reception panel #2 is CRI #1-2.

Thus, when the configuration of Embodiment 3-1 is applied, the UE reports CRIs from different TRPs in a group. Therefore, the network can schedule, on the basis of the CSI report, two beams from the same group with respect to multi-TRP transmission.

Embodiment 3-2

In Embodiment 3-2, the following may be employed in relation to each CSI resource configuration:
the number of CSI-RS resource sets configurable for the CSI resource configuration is up to P when a resource type (resourceType) is periodic/semi-persistent, and
the number of CSI-RS resource sets configurable for the CSI resource configuration is up to 16*P when the resource type (resourceType) is aperiodic.

Note that with respect to an aperiodic CSI-RS, as an aperiodic trigger state for each CSI resource configuration (RRC parameter "CSI-AperiodicTriggerStateList," "CSI-AperiodicTriggerState," or "CSI-AssociatedReportConfigInfo"), a higher layer parameter for selecting two CSI-RS resource sets from the CSI resource configuration may be configured for the UE.

With respect to the aperiodic CSI-RS, as the aperiodic trigger state for each CSI resource configuration (RRC parameter "CSI-AperiodicTriggerStateList," "CSI-AperiodicTriggerState," or "CSI-AssociatedReportConfigInfo"), a higher layer parameter for selecting one CSI-RS resource set and one SSB resource set from the CSI resource configuration may be configured for the UE.

For a resource set for which repetition is configured as 'OFF,' the UE may assume that CSI-RS resources in the resource set are TDMed. Note that for the resource set for which repetition is configured as 'OFF,' the UE may assume that the CSI-RS resources in the resource set are necessarily TDMed and FDM not applied.

The UE may assume that at least one of TDM and FDM is applied to CSI-RS resources between different resource sets related to a given CSI resource configuration (for example, CSI-RS resources of a first resource set and CSI-RS resources of a second resource set). In other words, it may be assumed that CSI-RS resources to be FDMed (for example, these are a plurality of CSI-RS resources other than QCL type D (QCL-D)) are allowed across only different CSI resource configurations.

In Embodiment 3-1, one CSI-RS resource set may correspond to one TRP.

FIGS. 13A to 13C are each a diagram to show an example of configuration of Embodiment 3-2.

FIG. 13A is an example of CSI-related configuration configured for the UE. In the present example, CSI report configuration #0 includes CSI resource configuration #0. CSI resource configuration #0 is related to resource set #0 (CSI-RS resource set #0) and resource set #1 (CSI-RS resource set #1). In this resource set #0, four CSI-RS resources corresponding to CRI #1-1 to CRI #1-4 are configured. In this resource set #1, four CSI-RS resources corresponding to CRI #2-1 to CRI #2-4 are configured.

Assuming that FIG. 13A corresponds to the example of FIG. 7, repetition='OFF' is configured for both resource sets #0 and #1.

FIGS. 13B and 13C are each a diagram to show an example of report configuration information (CSI-AssociatedReportConfigInfo) related to a trigger state of RRC used for the configuration of Embodiment 3-2. The name "CSI-AssociatedReportConfigInfo-r17" is used as a parameter scheduled to be introduced in Rel-17 NR, but the name is not limited to this.

FIG. 13B differs from report configuration information (CSI-AssociatedReportConfigInfo) related to a trigger state of existing, Rel-15 NR in that an NZP-CSI-RS resource set (resourceSet) included in channel measurement resource information (resourcesForChannel) corresponds to a plurality of (up to maxNrofresourcesets) (IDs of) CSI-RS resource sets. Therefore, a CSI-RS resource set related to a plurality of CMRs associated with one CSI resource configuration (CSI-ResourceConfig) is configured for the UE.

Note that an NZP-CSI-RS resource set ID (NZP-CSI-RS-ResourceSetID) of FIG. 13B is an integer value (INTEGER (1 . . . maxNrofNZP-CSI-RS-ResourceSetsPerConfig) indicating an entry number of an NZP-CSI-RS resource set list (nzp-CSI-RS-ResourceSetList) included in the CSI resource configuration. Here, maxNrofNZP-CSI-RS-ResourceSetsPerConfig may be interpreted as a maximum number of NZP-CSI-RS resource sets per CSI resource configuration) and so on.

FIG. 13C differs from report configuration information (CSI-AssociatedReportConfigInfo) related to a trigger state of existing Rel-15 NR in that a type of an ASN.1 object to define an NZP-CSI-RS resource set (resourceSet) included in channel measurement resource information (resourcesForChannel) is a "sequence type (SEQUENCE)," instead of a "choice type (CHOICE)." Therefore, the UE can judge that one CSI-RS resource set and one SSB resource set are associated with one CSI resource configuration (CSI-ResourceConfig).

Embodiment 3-3

In Embodiment 3-3, for a resource set for which repetition is configured as 'OFF,' the UE may assume that CSI-RS resources in groups (resource groups) of the resource set are TDMed. Note that for the resource set for which repetition is configured as 'OFF,' the UE may assume that the CSI-RS resources in the resource groups of the resource set are necessarily TDMed and FDM is not applied.

The UE may assume that at least one of TDM and FDM is applied to CSI-RS resources between different resource groups related to a given resource set (for example, CSI-RS resources of a first group and CSI-RS resources of a second resource group). In other words, it may be assumed that CSI-RS resources to be FDMed (for example, these are a plurality of CSI-RS resources other than QCL type D (QCL-D)) are allowed across only different resource groups.

In Embodiment 3-3, any one of the following may be employed in relation to the number K of CSI-RS resources configured for each CSI-RS resource set:

K is up to 64. CSI-RS resources related to an i-th (for example, i=1, 2, . . . ) resource group correspond to an i-th set of CSI-RS resource indices. Here, the i-th set corresponds to the i-th set out of index sets divided by K/P indices (which may be rounded off, rounded up, rounded down, or the like) from the lowest (or highest) CSI-RS resource index.

K is up to 64*P. CSI-RS resources related to an i-th (for example, i=1, 2, . . . ) resource group correspond to an i-th set of CSI-RS resource indices. Here, the i-th set corresponds to the i-th set out of index sets divided by K indices, from the lowest (or highest) CSI-RS resource index.

In Embodiment 3-3, one resource group may correspond to one TRP.

For a plurality of groups in a resource set for which repetition is configured as 'OFF,' the UE may assume that CSI-RS resources between the plurality of groups are necessarily TDMed and FDM is not applied. For a group in the resource set for which repetition is configured as 'OFF,' the UE may assume that at least one of TDM and FDM is applied to CSI-RS resources in the group. In this case, one group may correspond to a plurality of TRPs.

Figure 14A:
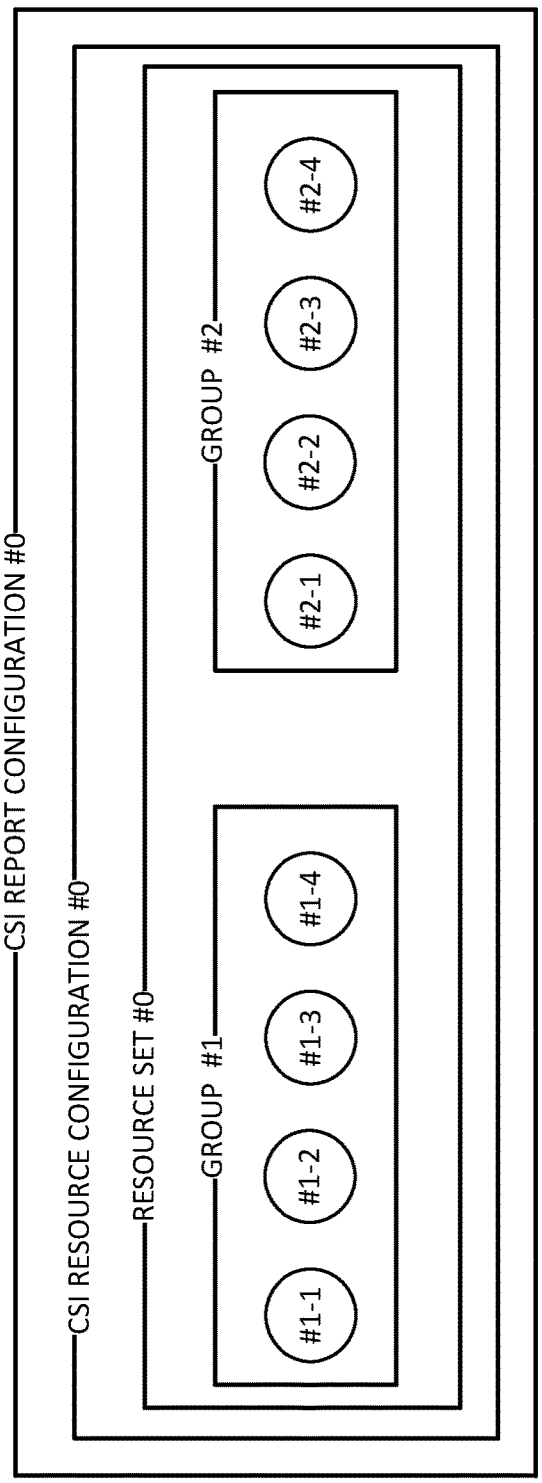
FIGS. 14A and 14B are each a diagram to show an example of configuration of Embodiment 3-3.
Figure 14B:
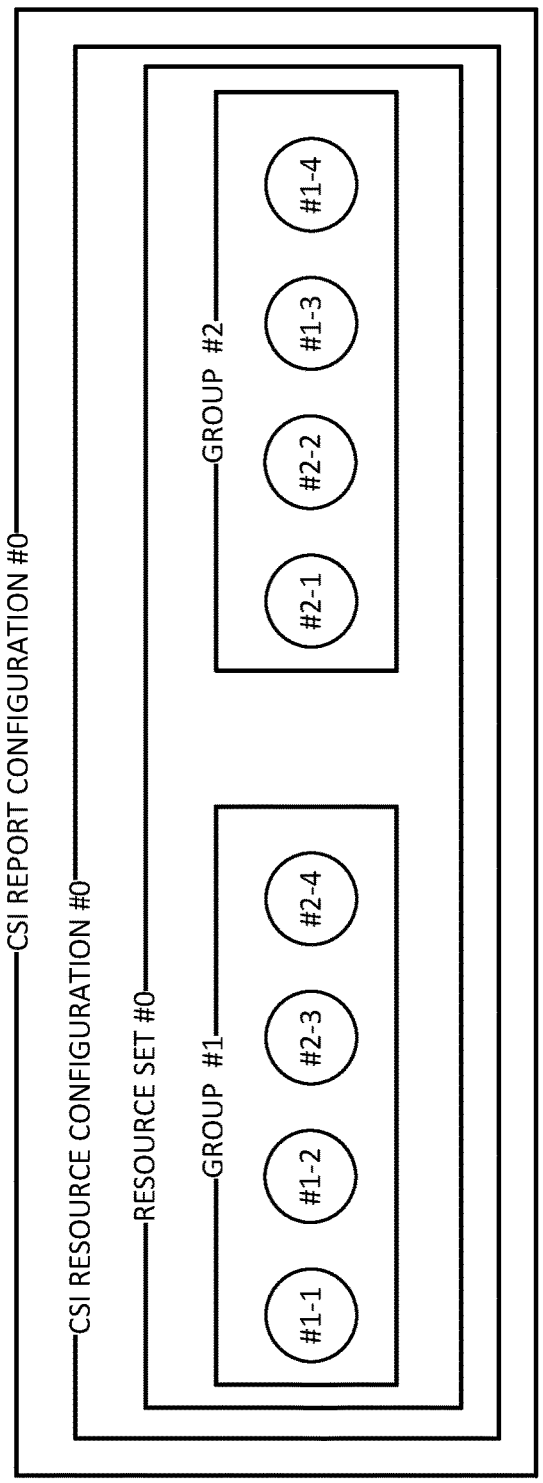

FIGS. 14A and 14B are each a diagram to show an example of configuration of Embodiment 3-3.

FIG. 14A is an example of CSI-related configuration configured for the UE. In the present example, CSI report configuration #0 includes CSI resource configuration #0. CSI resource configuration #0 is related to resource set #0 (CSI-RS resource set #0). In this resource set #0, group #1 and group #2 are configured. In group #1, four CSI-RS resources corresponding to CRI #1-1 to CRI #1-4 are configured. In group #2, four CSI-RS resources corresponding to CRI #2-1 to CRI #2-4 are configured. Thus, one group may correspond to one TRP.

Note that assuming that FIG. 14A corresponds to the example of FIG. 7, repetition='OFF' is configured for both group #0 and group #1.

FIG. 14B is an example of CSI-related configuration configured for the UE. FIG. 14B differs from FIG. 14A in that four CSI-RS resources corresponding to CRI #1-1, CRI #1-2, CRI #2-3, and CRI #2-4 are configured in group #1. In group #2, four CSI-RS resources corresponding to CRI #1-3, CRI #1-4, CRI #2-1, and CRI #2-2 are configured. Thus, one group may correspond to a plurality of TRPs.

Embodiment 3-4

In Embodiment 3-4, for a resource set for which repetition is configured as 'OFF,' the UE may assume that CSI resources in the resource set are TDMed. Note that for the resource set for which repetition is configured as 'OFF,' the UE may assume that each CSI-RS resource of the resource set is necessarily TDMed and FDM is not applied.

In Embodiment 3-4, one CSI-RS resource may support a specific number of ports (or port groups) (for example, 2 ports or 4 ports). When the number of ports (or port groups) is 2, CSI-RS resources of a first port (or port group) may be related to one TRP, and CSI-RS resources of a second port (or port group) may be related to another TRP. When the number of ports (or port groups) is 4, CSI-RS resources of first and second ports (or port groups) may be related to one TPR, and CSI-RS resources of third and fourth ports (or port groups) may be related to another TRP.

In Embodiment 3-4, one CSI-RS port (or port group) may correspond to one TRP.

Figure 15:
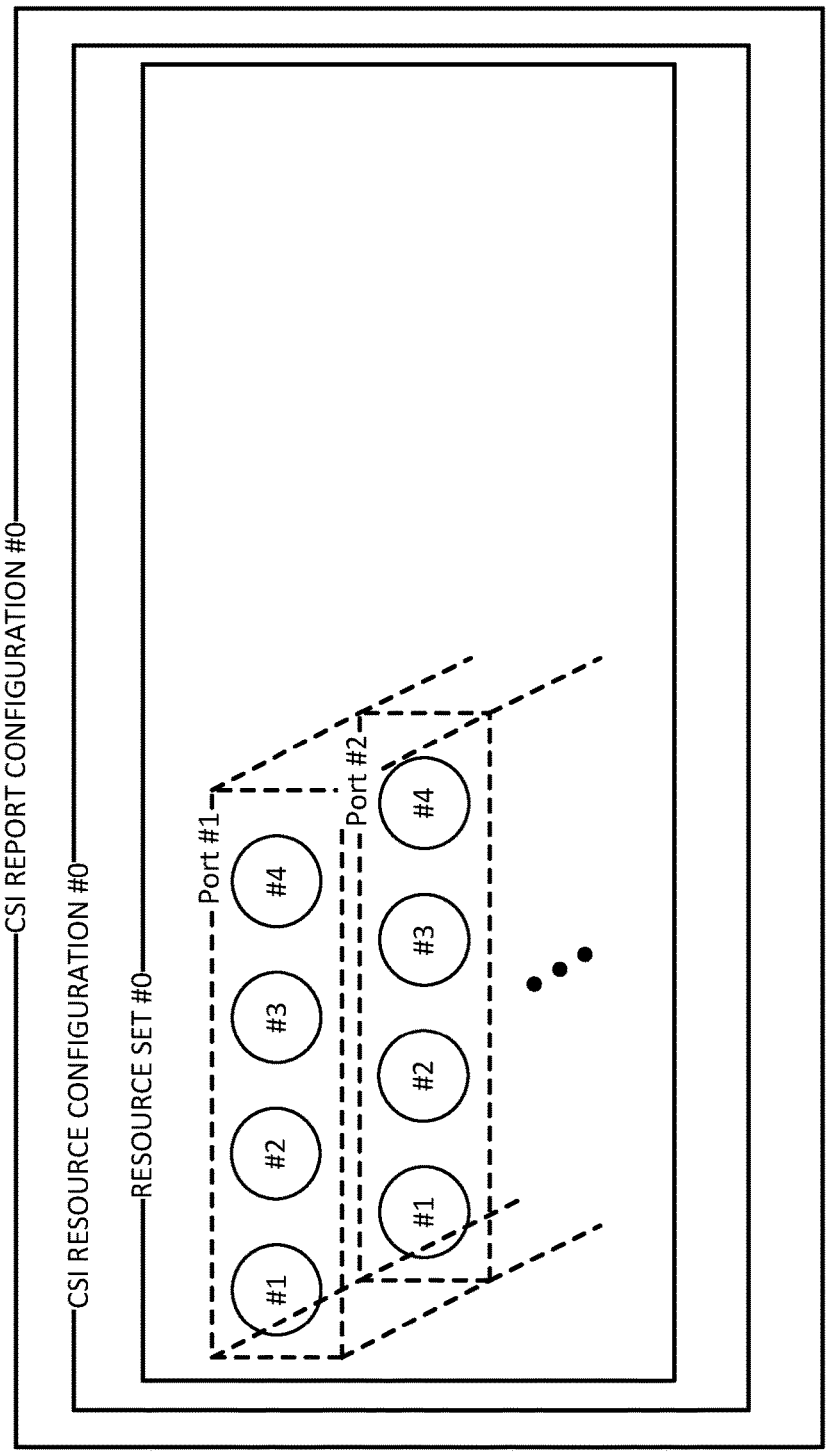
FIG. 15 is a diagram to show an example of configuration of Embodiment 3-4.

FIG. 15 is a diagram to show an example of configuration of Embodiment 3-4. FIG. 15 is an example of CSI-related configuration configured for the UE. In the present example, CSI report configuration #0 includes CSI resource configuration #0. CSI resource configuration #0 is related to resource set #0 (CSI-RS resource set #0). In the resource set #0, CSI-RS resources #1 to #4 are configured. Repetition='OFF' is configured for the resource set #0. The respective resources are associated with a group of ports (Ports #1, #2, . . . ) each corresponding to a TRP.

According to the third embodiment described above, a configuration related to CSI with consideration of a TRP is configured for the UE, and thus the UE can preferably report a CSI report with consideration of a combination of beams simultaneously transmitted from the TRP.

Fourth Embodiment

A fourth embodiment relates to reporting for configuration of the multiple group-based beam reporting described in the third embodiment.

With respect to mode 1 multiple group-based beam reporting, a UE may transmit information (for example, capability information (UE capability)) related to the number of transmit beams (CRI) related to the same TRP in a group to be reported (the number may be referred to as N1).

With respect to Embodiment 3-1, CRI in the same resource configuration is included in one report group, but may not be included across different report groups. For example, the case of FIG. 11C corresponds to N1=2.

With respect to Embodiment 3-2, CRI in the same resource set is included in one report group, but may not be included across different report groups.

With respect to Embodiment 3-3, CRI in the same resource group is included in one report group, but may not be included across different report groups.

With respect to Embodiment 3-4, CRI in the same port group is included in one report group, but may not be included across different report groups.

With respect to mode 2 multiple group-based beam reporting, the UE may transmit information (for example, capability information (UE capability)) related to the number of transmit beams (CRI) related to different TRPs in a group to be reported (the number may be referred to as N2).

With respect to Embodiment 3-1, CRI in different resource configurations is included in one report group, but CRI in the same resource configuration may not be included in one report group. For example, the case of FIG. 12C corresponds to N2=2.

With respect to Embodiment 3-2, CRI in different resource sets is included in one report group, but CRI in the same resource set may not be included in one report group.

With respect to Embodiment 3-3, CRI in different resource groups is included in one report group, but CRI in the same resource group may not be included in one report group.

With respect to Embodiment 3-4, CRI in different port groups is included in one report group, but CRI in the same port group may not be included in one report group.

According to the fourth embodiment described above, on the basis of information reported from the UE, a network can appropriately perform, for the UE, configuration related to CSI with consideration of a TRP.

<Others>

Note that in the present disclosure, a group may correspond to a panel (or panel index) of a UE. In this case, the UE may assume that a beam/RS of each group is measured in each panel of the UE. The UE may assume that beams of a plurality of groups are simultaneously received (with use of different panels).

In the present disclosure, the group may correspond to a panel (or panel index) of a TRP (or base station). In this case, the UE may assume that a beam/RS of each group is transmitted from a panel of each TRP (or base station). The UE may assume that beams of a plurality of groups can be simultaneously received, or may assume that the simultaneous reception fails.

Here, each of the panel of the UE, the panel of the TRP (or base station), and the like and each of an RS group, an antenna port group, a spatial relation group, a QCL group, a TCI state group, a CORESET group, and the like may be interchangeably interpreted.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 16:
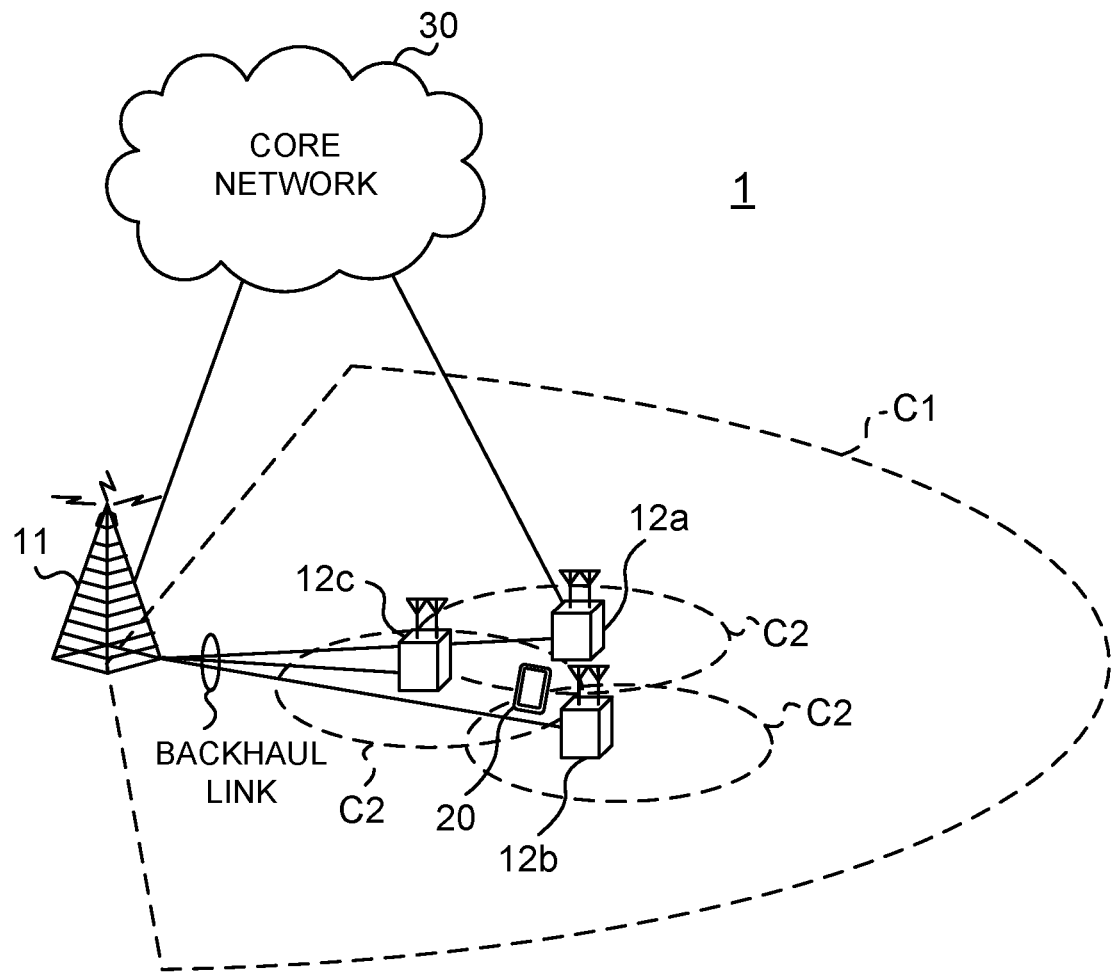
FIG. 16 is a diagram to show an example of a schematic structure of a radio communication system according to one embodiment.

FIG. 16 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL" assignment, "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 17:
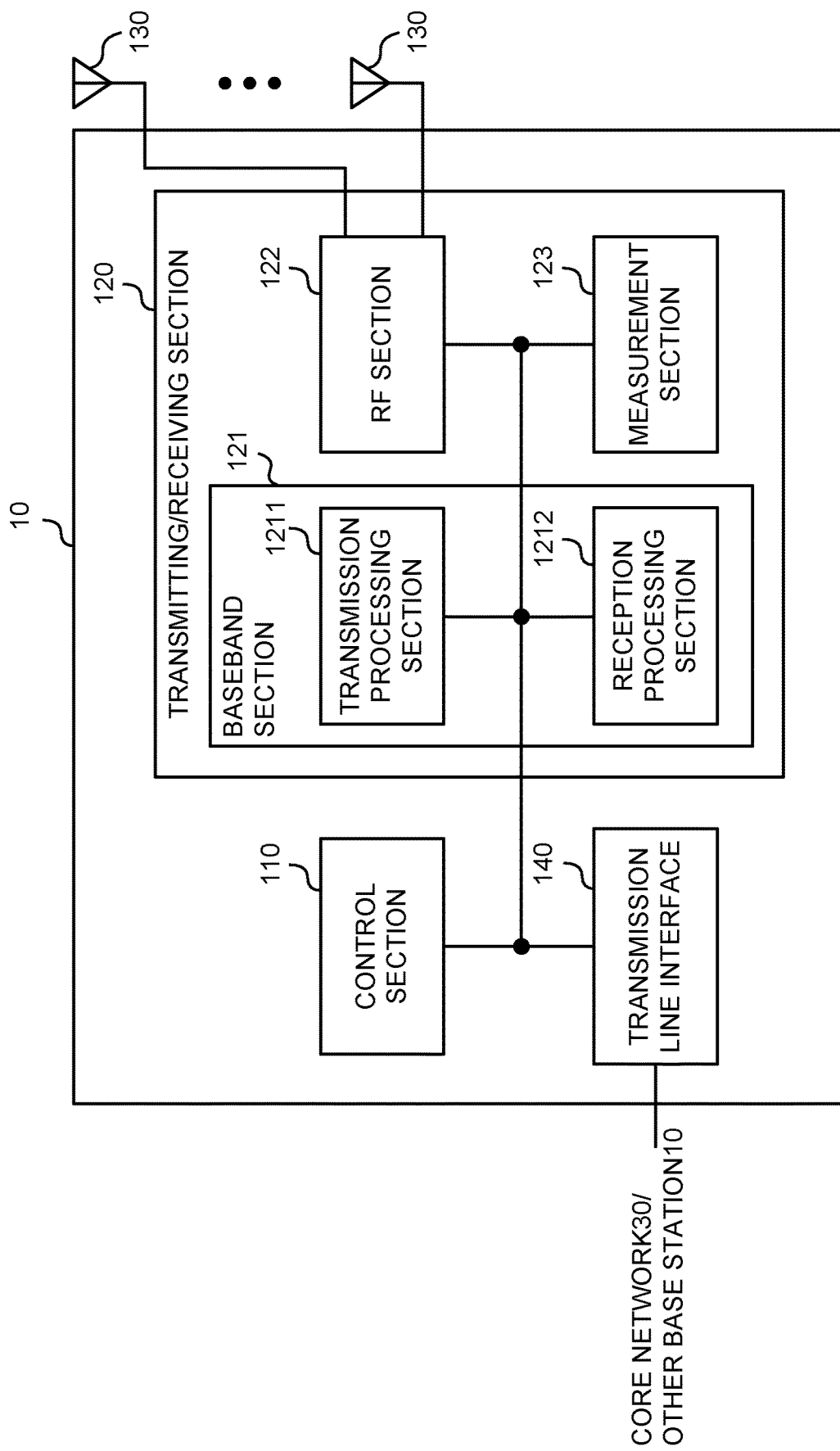
FIG. 17 is a diagram to show an example of a structure of a base station according to one embodiment.

FIG. 17 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate a bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit, to the user terminal 20, a plurality of specific configurations in relation to a channel state information (CSI) report configuration.

The transmitting/receiving section 120 may receive, from the user terminal 20, a CSI report including CSI for each group (in other words, one or more group reports including one or more measurement results in units of groups), the CSI including CSI based on a first specific configuration and CSI based on a second specific configuration, the first specific configuration and the second specific configuration being out of the plurality of specific configurations.

(User Terminal)

Figure 18:
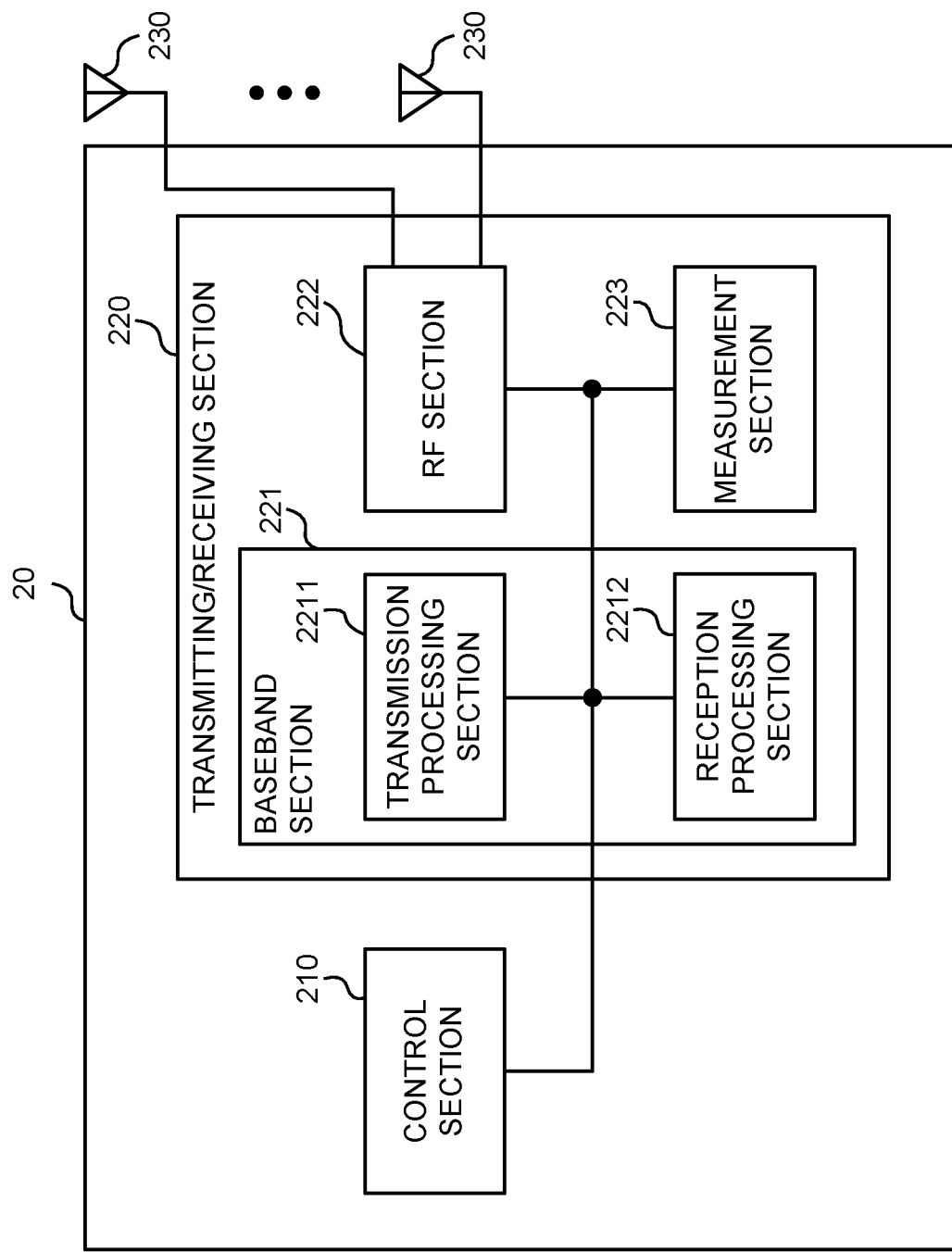
FIG. 18 is a diagram to show an example of a structure of a user terminal according to one embodiment.

FIG. 18 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive a plurality of specific configurations in relation to a channel state information (CSI) report configuration (CSI-ReportConfig). Any or each of the specific configurations may be a CSI resource configuration (CSI-ResourceConfig), may be a CSI resource set configuration (for example, NZP-CSI-RS-ResourceSet), may be a CSI resource group configuration (for example, group information associated with NZP-CSI-RS-Resource), or may be a CSI resource port group configuration (for example, port group information associated with NZP-CST-RS-Resource).

The control section 210 may configure a CSI report including CSI for each group (in other words, one or more group reports including one or more measurement results in units of groups) such that the CSI report includes CSI based on a first specific configuration (for example, a configuration related to a first TRP) and CSI based on a second specific configuration (for example, a configuration related to a second TRP), the first specific configuration and the second specific configuration being out of the plurality of specific configurations.

The transmitting/receiving section 220 may transmit the above-described CSI report to the base station 10.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 19:
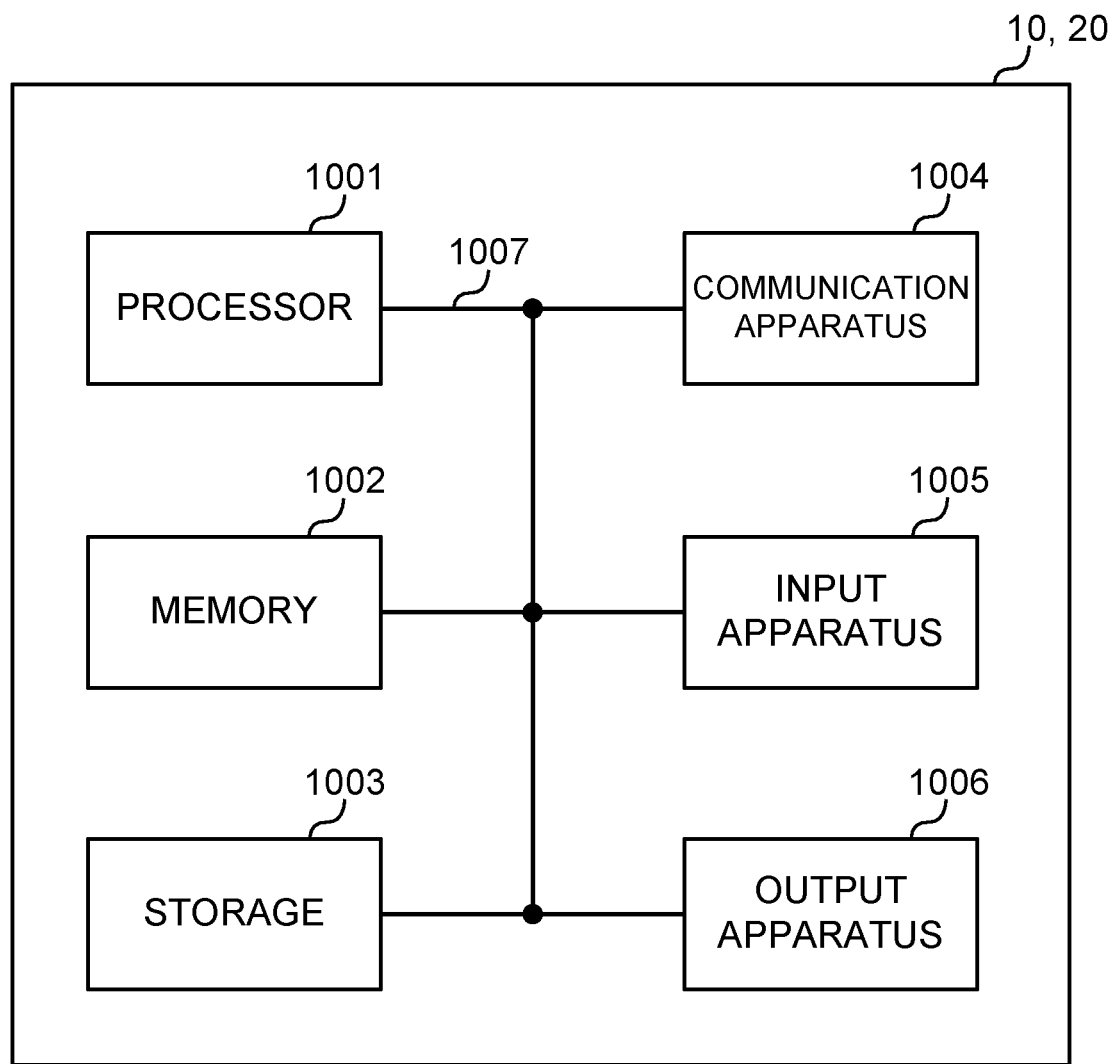
FIG. 19 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 19 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or different manners with two or more processors. Note that the processor 1001 may be implemented with one more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mind-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given channel/signal outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number or mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or protons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "a gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a "small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives a channel state information (CSI) report configuration including multiple configuration information related to group-based beam reporting and information indicating a plurality of resource sets; and
a processor that, when the group-based beam reporting is configured, controls transmission of a CSI report including CSI for each group including for same resource a plurality of CSI-RS Resource Indicators (CRIs) or a plurality of SS/PBCH Block Resource Indicators (SSBRIs) and reference signal received power (RSRP) and differential RSRP, based on the plurality of resource sets,
wherein the CSI report includes CSIs corresponding to a plurality of the group,
the multiple configuration information related to the group-based beam reporting includes higher layer parameters that configure whether the group-based beam report is enabled or disabled, the higher layer parameters including a first parameter and a second parameter that is different from the first parameter, and
the plurality of resource sets are two resource sets when the group-based beam report is configured to be enabled by the first parameter or the second parameter,
wherein each of the plurality of resource sets includes resources that can be simultaneously received by the terminal.

2. A radio communication method for a terminal, comprising:
receiving a channel state information (CSI) report configuration including multiple configuration information related to group-based beam reporting and information indicating a plurality of resource sets; and
when the group-based beam reporting is configured, controlling transmission of a CSI report including CSI for each group including for same resource a plurality of CSI-RS Resource Indicators (CRIs) or a plurality of SS/PBCH Block Resource Indicators (SSBRIs) and reference signal received power (RSRP) and differential RSRP, based on the plurality of resource sets,
wherein the CSI report includes CSIs corresponding to a plurality of the group,
the multiple configuration information related to the group-based beam reporting includes higher layer parameters that configure whether the group-based beam report is enabled or disabled, the higher layer parameters including a first parameter and a second parameter that is different from the first parameter, and
the plurality of resource sets are two resource sets when the group-based beam report is configured to be enabled by the first parameter or the second parameter,
wherein each of the plurality of resource sets includes resources that can be simultaneously received by the terminal.

3. A base station comprising:
a transmitter that transmits a channel state information (CSI) report configuration including multiple configuration information related to group-based beam reporting and information indicating a plurality of resource sets; and
a processor that controls to configure the group-based beam reporting such that a terminal controls, based on the plurality of resource sets, transmission of a CSI report including CSI for each group including for same resource a plurality of CSI-RS Resource Indicators (CRIs) or a plurality of SS/PBCH Block Resource Indicators (SSBRIs) and reference signal received power (RSRP) and differential RSRP,
wherein the CSI report includes CSIs corresponding to a plurality of the group,
the multiple configuration information related to the group-based beam reporting includes higher layer parameters that configure whether the group-based beam report is enabled or disabled, the higher layer parameters including a first parameter and a second parameter that is different from the first parameter, and
wherein the plurality of resource sets are two resource sets when the group-based beam report is configured to be enabled by the first parameter or the second parameter, and
wherein each of the plurality of resource sets includes resources that can be simultaneously received by the terminal.

4. A system comprising a terminal and a base station, wherein
the terminal comprises:
a receiver that receives a channel state information (CSI) report configuration including multiple configuration information related to group-based beam reporting and information indicating a plurality of resource sets; and
a processor that, when the group-based beam reporting is configured, controls transmission of a CSI report including CSI for each group including for same resource a plurality of CSI-RS Resource Indicators (CRIs) or a plurality of SS/PBCH Block Resource Indicators (SSBRIs) and reference signal received power (RSRP) and differential RSRP, based on the plurality of resource sets,
wherein the CSI report includes CSIs corresponding to a plurality of the group,
the multiple configuration information related to the group-based beam reporting includes higher layer parameters that configure whether the group-based beam report is enabled or disabled, the higher layer parameters including a first parameter and a second parameter that is different from the first parameter,
the plurality of resource sets are two resource sets when the group-based beam report is configured to be enabled by the first parameter or the second parameter,
wherein each of the plurality of resource sets includes resources that can be simultaneously received by the terminal, and
the base station comprises:
a transmitter that transmits the CSI report configuration.

* * * * *